US012793000B2

(12) United States Patent
Kraus et al.

(10) Patent No.: US 12,793,000 B2
(45) Date of Patent: Nov. 10, 2026

(54) BLOCKCHAIN BASED WORK AND RESOURCE DATA MANAGEMENT

(71) Applicant: GENETEC INC., St-Laurent (CA)

(72) Inventors: Klemens Kraus, Vienna (AT); Stephan Sutor, Vienna (AT); Sigurd Decroos, Oudenburg (BE); Pierre Racz, Montreal (CA); Vincent Labrecque, Montreal (CA)

( * ) Notice: Subject to any disclaimer, the term of this patent is extended or adjusted under 35 U.S.C. 154(b) by 0 days.

(21) Appl. No.: 17/334,912

(22) Filed: May 31, 2021

(65) Prior Publication Data

US 2022/0012668 A1 Jan. 13, 2022

Related U.S. Application Data

(60) Provisional application No. 63/050,298, filed on Jul. 10, 2020.

(51) Int. Cl.

*G06Q 10/0639* (2023.01)
*H04L 9/00* (2022.01)
*H04L 9/32* (2006.01)

(52) U.S. Cl.

CPC . *G06Q 10/06398* (2013.01); *G06Q 10/06393* (2013.01); *H04L 9/3236* (2013.01); *H04L 9/3247* (2013.01); *H04L 9/50* (2022.05)

(58) Field of Classification Search

CPC .. G06Q 10/06; G06Q 10/06393; G06F 16/22; G06F 16/27; H04L 9/3236; H04L 9/3247; H04L 9/50

See application file for complete search history.

(56) References Cited

U.S. PATENT DOCUMENTS 6,349,238 B1 2/2002 Gabbita et al.
6,938,240 B2 8/2005 Charisius et al.
(Continued)

FOREIGN PATENT DOCUMENTS

CN 108805404 A 11/2018
CN 108881459 A 11/2018
(Continued)

OTHER PUBLICATIONS

D. Ruan, Y. Hua and Z. Pang, "A kind of two-level cooperation distributed scheduling strategy," 2014 IEEE 5th International Conference on Software Engineering and Service Science, Beijing, China, 2014, pp. 410-413, doi: 10.1109/ICSESS.2014.6933594. (Year: 2014).*

(Continued)

*Primary Examiner* — Jerry O'Connor
*Assistant Examiner* — Ayanna Minor
(74) *Attorney, Agent, or Firm* — Anglehart et al.

(57) ABSTRACT

A work and resource data management system, for example for managing security officers in the field, uses a blockchain data structure providing a fully immutable and cryptographically secured system, instead of a traditional database structure. Separate chains of blocks can be used for different actors, parties or resources while linking data between the various blockchains to provide a connected data structure related to each work item. The improved system may allow for being temporarily disconnected, any part of the system may branch off to an asynchronous state while disconnected and resynchronize when connection to the network is re-established. As blocks can be added and not deleted, a full history of every action that happened in the system can be retained.

22 Claims, 16 Drawing Sheets

(56) References Cited

U.S. PATENT DOCUMENTS

| | | | | |
|---|---|---|---|---|
| 7,945,465 | B2 | 5/2011 | Theiler | |
| 10,437,585 | B2 | 10/2019 | Mills | |
| 10,713,737 | B1 | 7/2020 | Blackburn et al. | |
| 10,762,217 | B2 | 9/2020 | Thekadath et al. | |
| 2010/0257015 | A1* | 10/2010 | Molander | G06Q 10/06 707/E17.014 |
| 2016/0078470 | A1 | 3/2016 | McHugh et al. | |
| 2018/0174255 | A1 | 6/2018 | Hunn et al. | |
| 2019/0042989 | A1 | 2/2019 | Scott | |
| 2019/0102757 | A1 | 4/2019 | Liu | |
| 2019/0272496 | A1 | 9/2019 | Moeller | |
| 2019/0377712 | A1* | 12/2019 | Miller | G06F 21/64 |
| 2019/0384842 | A1 | 12/2019 | Rao | |
| 2019/0392392 | A1 | 12/2019 | Elden et al. | |
| 2020/0005415 | A1 | 1/2020 | Schuler et al. | |
| 2020/0007464 | A1* | 1/2020 | Lo | H04L 9/0894 |
| 2020/0042361 | A1 | 2/2020 | Clark | |
| 2020/0043590 | A1 | 2/2020 | Lee et al. | |
| 2020/0142739 | A1* | 5/2020 | Chan | G06F 21/16 |
| 2020/0162236 | A1* | 5/2020 | Miller | G06F 40/174 |
| 2020/0192664 | A1 | 6/2020 | Ionescu et al. | |
| 2020/0293959 | A1 | 9/2020 | O'Herlihy et al. | |
| 2021/0232453 | A1* | 7/2021 | Zhuo | G06F 16/2379 |

FOREIGN PATENT DOCUMENTS

| | | | | |
|---|---|---|---|---|
| CN | 108898289 | A | 11/2018 | |
| CN | 109949006 | A | 6/2019 | |
| CN | 109978409 | A | 7/2019 | |
| CN | 110097345 | A | 8/2019 | |
| CN | 110720204 | A * | 1/2020 | G06F 16/2255 |
| CN | 110727712 | A | 1/2020 | |
| CN | 111131508 | A | 5/2020 | |
| CN | 108596548 | B | 11/2020 | |
| EP | 3598356 | A1 | 1/2020 | |
| WO | 2008/118115 | A2 | 10/2008 | |

OTHER PUBLICATIONS

Viriyasitavat et al., "Blockchain characteristics and consensus in modern business processes." Journal of Industrial Information Integration 13 (2019): 32-39.https://www.researchgate.net/profile/Wattana_Viriyasitavat/publication/326680277_Blockchain_Characteristics_and_Consensus_in_Modern_Business_Processes/links/5ee9c67a299bf1faac5c8a37/Blockchain-Characteristics-and-Consensus-in-Modern-Business-Processes.pdf.

Lenarduzzi et al., "Blockchain applications for Agile methodologies." Proceedings of the 19th International Conference on Agile Software Development: Companion. 2018. https://dl.acm.org/doi/pdf/10.1145/3234152.3234155.

Killer et al., "Security Management and Visualization in a Blockchain-based Collaborative Defense." 2019 IEEE International Conference on Blockchain and Cryptocurrency (ICBC). IEEE, 2019. https://files.ifi.uzh.ch/CSG/staff/rodrigues/extern/theses/ma-christiankiller.pdf.

International application No. PCT/CA2021/050946 International Search Report dated Nov. 2, 2021.

International application No. PCT/CA2021/050946 Written Opinion of the International Searching Authority dated Nov. 2, 2021.

* cited by examiner

BLOCKCHAIN BASED WORK AND RESOURCE DATA MANAGEMENT

CROSS-REFERENCE TO RELATED APPLICATIONS

This application claims priority from U.S. provisional patent application 63/050,298 filed Jul. 10, 2020, the contents of which are hereby incorporated by reference.

TECHNICAL FIELD

The present application relates to work or task and resource data management and, more particularly, to systems and methods for secure work and resource data management through blockchains.

BACKGROUND

Work and resource data management system can have a multitude of applications, ranging from managing security officers in the field, to dispatching IT tickets to technicians in a support center. These systems are typically built around traditional database architectures where work and resource information are stored in tables and relations between the data in its rows and columns are defined in order to enable data queries (e.g. SQL database management systems). While these database architectures may be efficient performance-wise, they have a number of significant limitations which may be problematic.

The main issue with these databases stems from the fact that the data is updated in place. As such, when certain changes are made to the data, the previous data state may forever be lost as may be the record that a change happened. It may thus be impossible to know data node history and therefore be unable to provide an accurate audit trail. Furthermore, because certain changes are lost, it may not be possible to have a full picture of how decisions were made (i.e. based on which state of information).

Additionally, while relatively easy to perform, malicious or accidental manipulation of data may be very hard or impossible to detect in these database architectures.

Another limitation of the traditional database systems is that they require to be connected and have a synchronous state across all people and systems involved. This implies that as soon as connectivity is lost, the system may no longer function. Constant network connection is hard to achieve in practice as network and equipment outages are possible and users which can move into areas deprived of wireless network reception. Additionally, even while connected to the network, latency may result in similar synchronization challenges. Any of these issues can put an organization or business at serious risk and may significantly limit the operations due to the required network connection.

As such, there is a need for an improved system architecture that may provide work and resource data management in such a way as to overcome one or more of the aforementioned issues.

SUMMARY

Applicant has discovered an improved system architecture overcoming at least in part the issues of traditional database architectures for managing data in a task or work item data system. This improved system architecture described herein may use a consistent system of blockchains as a basic storage mechanism for work items and for resources, thus creating a fully immutable and cryptographically secured system.

This means that, by design, the improved system can allow for separate chains of blocks to be used for different actors, parties or resources while provide for linking data between the various blockchains to provide a connected data structure related to each work item. This also means that, by design, the improved system may allow for being temporarily disconnected. By sharing a state of knowledge while connected, any part of the system may branch off to an asynchronous state while disconnected and thereafter resynchronize when connection to the network is re-established.

Additionally, the use of a blockchain implementation for the work and resource data management system may not allow any data to ever be overwritten or deleted. It thus becomes possible to retain a full history of every action that happened in the system, maintaining a complete audit trail and enabling the investigation on the state-of-knowledge at any given time in the past. In some embodiments, the investigation may even be performed across different viewpoints in temporary inconsistent states (e.g. from different resources, where some of which may have been in an asynchronous state due to the lack of a network connection).

Using blockchain to implement the improved work and resource data management system further prevents any data tampering in the system. As a matter of fact, since the blocks of a blockchain may include a hash signature from the previous block, any modification of a single block in the blockchain would be near impossible as blockchains are broken if any changes are made to them.

In some embodiments, the data management system may behave in a manner similar to an accretive database in that the data is built up by accretion, for example by adding blocks to blockchains, with the blocks bearing timestamps so that the data can be viewed at any point in time. The use of plural blockchains may allow for the data to be securely created and stored in a distributed manner across a network of devices, for example across resource devices and at one or more operator or control centers.

In some embodiments, there is provided a method for storing data related to a plurality of work items, each one of the work items defining at least actions for handling a task. The method may involve creating at least one blockchain related to each one of the work items, and assigning at least one resource to each one of the work items. The assigning may involve recording an assignment in the at least one blockchain related to each one of the work items, and transmitting to the at least one resource of each one of the work items the assignment. In this way, the resources can be assigned to more than one of the work items. Blocks of a blockchain can be received from each of the resources, in which the blocks may encode data related to a state or action of the resources related to their use or work and in response to the assignment, with each one of the resources building the blocks of the blockchain. An association between the blocks received and the work items can be generated in accordance with the assignment. The blocks of the blockchain from each of the resources can be stored with index data using the association. In response to a request to retrieve data concerning one of the work items, the index data can be used to retrieve data from blocks of the at least one blockchain related to each one of the work items and the blocks of the blockchain from each of the resources to provide retrieved data. In this way, integrity of the retrieved data can be verified using blockchain signatures prior to providing retrieved data or by including blockchain signatures in the retrieved data.

In some embodiments, the at least one blockchain related to each one of the work items may comprise a work item blockchain for each one of the work items. The method may further involve obtaining at least one new block for the work item blockchain responsive to the generating, the at least one new block in the work item blockchain may encode the data related to a state or action of the resources related to their use or work and in response to the assignment.

In some embodiment, the at least one blockchain related to each one of the work items may comprise a plurality of resource blockchains recording the actions of a corresponding plurality of resources. The plurality of resource blockchains may comprise a plurality of operator blockchains recording the actions of a corresponding plurality of operators.

In some embodiments, the creating at least one blockchain may further involve initializing the at least one blockchain by referencing a global blockchain.

In some embodiments, the creating at least one blockchain may further comprise initializing the at least one blockchain by referencing a previous blockchain related to a previous work item.

In some embodiments, the at least one blockchain related to each one of the work items may comprise a work item creator identifier.

In some embodiments, the method may further involve resolving a loss of continuity in at least one of the at least one blockchain related to each one of the work items and the blockchain from each of the resources. The resolving may comprise manual editing of the at least one blockchain related to each one of the work items and the blockchain from each of the resources. The resolving may also involve automatic policies editing the at least one blockchain related to each one of the work items and the blockchain from each of the resources.

In some embodiments, the providing retrieved data may further involve authenticating credentials of a user requesting access to the retrieved data.

In some embodiments, the providing retrieved data may further involve displaying a work item timeline representative of the data related to work items.

In some embodiments, the request to retrieve data may further involve data concerning at least one resource.

In some embodiments, the providing retrieved data may further involve displaying a resource timeline representative of the data related to a state or action of the resources related to their use or work and in response to the assignment.

In some embodiments, the providing retrieved data may further involve displaying a composite timeline representative of the data related to work items and the data related to a state or action of the resources related to their use or work and in response to the assignment.

In some embodiments, the method may further involve validating integrity of at least one block of at least one of the at least one blockchain related to each one of the work items and the blockchain from each of the resources. In this way, the validating integrity may comprise validating blockchain signatures.

In some embodiments, the method may further involve generating a branched blockchain related to planned work item and resource activities, the branched blockchain being branched from the at least one blockchain related to each one of the work items as a main branch. The method may further involve using the branched blockchain related to planned work item and resource activities to determine resource constraints and to perform an evaluation if a resource may adequately perform the work of a work item. The method may further involve validating a resource assignment using a result of the evaluation. The method may further involve, after work has been performed, comparing the branched blockchain to actual work performed as stored in the main branch. A result of the comparison may be displayed.

In some embodiments, there is provided a server for storing data related to work items comprising non-transitory memory and a processor, the memory storing instructions for implementing the method as defined above.

In some embodiments, there is provided a system for storing data related to work items, the system comprising at least one server as defined above, and at least one remote device for each of the at least one resource, the at least one remote device being operable to generate the blocks encoding data related to a state or action of the resources related to their use or work and in response to the assignment and to send the blocks to the at least one server.

BRIEF DESCRIPTION OF THE DRAWINGS

The invention will be better understood by way of the following detailed description of embodiments of the invention with reference to the appended drawings, in which.

DETAILED DESCRIPTION

In the following description, specific details may be used to provide better understanding of the various embodiments of the disclosure. However, someone skilled in the art would understand that various embodiments may be practiced without using every element or feature described herein. Furthermore, well-known circuits, structures and techniques may not be described at length in order to avoid obscuring the description of the various embodiments with unnecessary details. It should be understood that various changes may be made to the exemplary embodiments described herein without departing from the teachings of the disclosure.

In this disclosure, the term "resource" is defined as including an entity that either performs work or is used to perform work. This includes staff (humans performing the work), but also vehicles, rooms or places, equipment and materials required to perform the work. All resources may have one or more different attributes such that they may be better suited for some work than others (e.g. an officer may be better suited to investigate a potential break-in than a desk clerk). The attributes associated with a given resource are used to characterize that resource.

The term "Work item" is defined as any type of work that needs to be done. The concept of a work item may thus cover a number of situations depending on the application and industry. For example, a work item may be an incident in emergency management, a case or record in records management, a work request or work order in field force management, a task in productivity management or a ticket in IT support.

A work item may go through different states during its life cycle (from creation to completion), which highly depends on the operational processes of the user. During this process, one or multiple resources may be assigned to the work item and the work is performed. In some embodiments, a work item may have a one or more different attributes, that may describe either what needs to be done, where the task should be performed and/or how the task should be executed. The attributes associated with a given work item are used to characterize that work item.

Attributes characterizing work items and/or resources can either be stored directly in the respective blockchain or by assigning auxiliary types to each of the blocks of the work item and resource blockchains.

The term "blockchain" is defined as any type of data structure with immutable back-linked data blocks thereby forming a chain of data. Each block in the blockchain is implemented such that any modification of payload data of a given block is detectable thus making the blockchain immutable. The blockchain can be implemented by having each block in the blockchain store in its metadata a hash signature of the previous block (other than the first block in the blockchain) and a hash signature of the current block's payload data.

Figure 1:
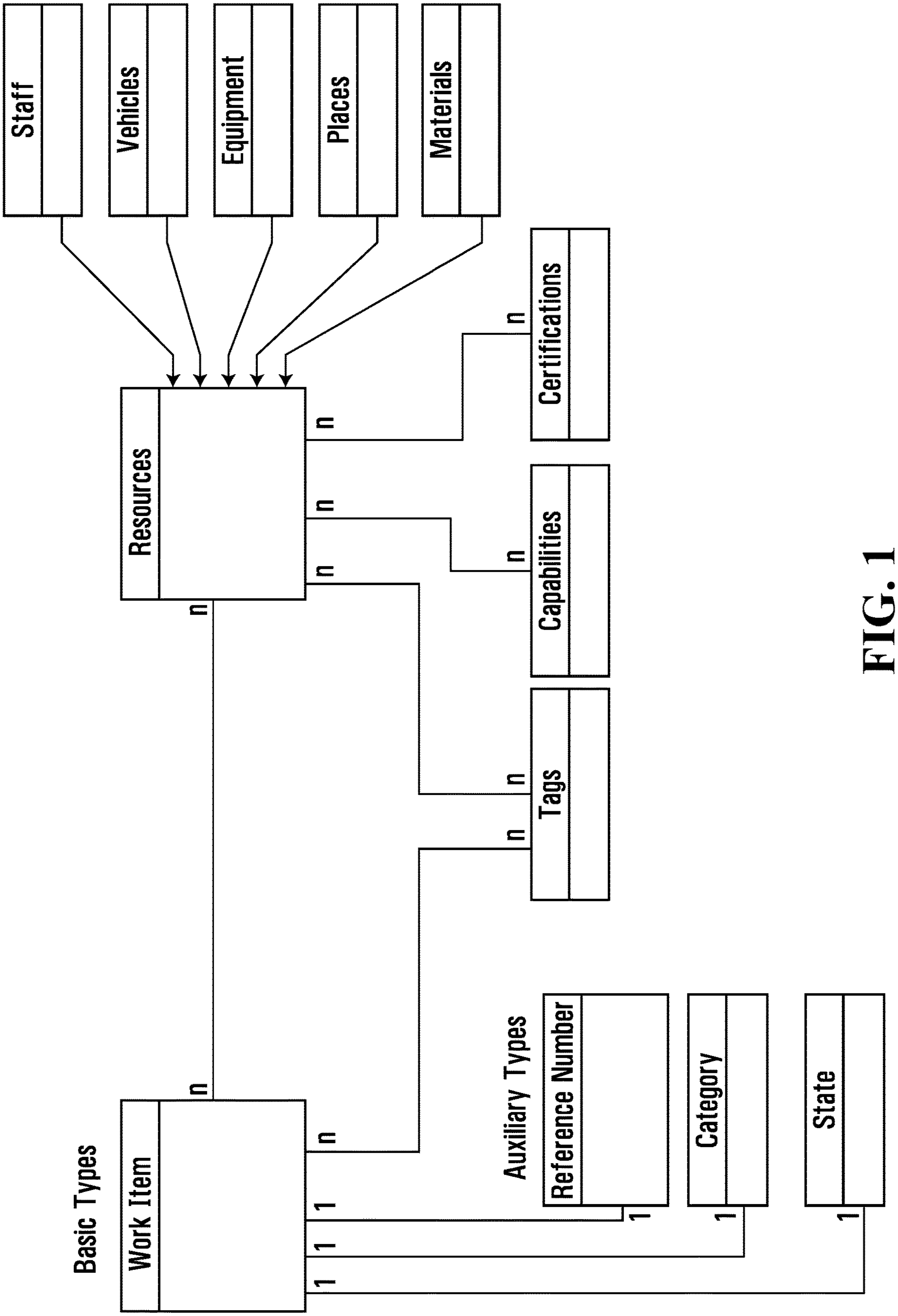
FIG. 1 is a system diagram of an exemplary embodiment of the work and resource data management system showing the work item, resource, and auxiliary types of modules with an exemplary set of corresponding components.

Reference is now made to FIG. 1, which is a system diagram of an exemplary embodiment of the work and resource data management system showing the work item, resource, and auxiliary types of modules with an exemplary set of corresponding components. In FIG. 1, a work item (basic type of module) is created and a number of auxiliary characteristics (auxiliary types of modules) are assigned to it.

Auxiliary types may be sets of attributes, that are either predefined or defined outside the work item or resource, that can be assigned to a work item or a resource or both. For example, auxiliary types for work items may be their category (which type of work), their state (e.g. waiting for info, working on it, ready for approval, completed, etc.) or simply a reference number or one or more tags that may be used for indexing and searching. It will be understood that the auxiliary type for work items may include any other parameter that may otherwise not be inherent to the creation of the work item block (an inherent parameter may be, for example, the date of creation and the user requesting creation of the work item), such as a reason for the creation of the work item, the name or identifier of the client, etc.

For the resource block items, examples of auxiliary types that may be associated with each block are tags, availabilities of the resource, capabilities of the resource, certifications held by the resource or any other information that may be assigned from predefined values. Certain auxiliary types may apply to both work items and categories, such as generic tags, comments or other information. In other embodiments, the blocks from the work item and of the resource may store all the information without external association with auxiliary types. The tags, availabilities, capabilities, and/or certifications of a given resource may have to correspond to one or more requirements of a work item's category in order for that resource to be assigned to that work item.

The preferred embodiment of this disclosure applies to a work management system. It is built on the two basic concepts, work items that are to be performed and resources that perform them or are assigned to them. While the following description mainly describes a work and resource data management system, the system and method presented herein may be used in any other application.

In some embodiments, both the work items and the resources are stored as immutable blockchains (as well as the auxiliary types). Each one of the work items and each one of the resources is represented by separate blockchains, and the same may be applied to auxiliary types when used in the implementation of the system. The separate blockchains may thus represent the complete lifecycle of the work item or resource. The aforementioned auxiliary types, which can be assigned to work items, resources or both, may be stored in their own blockchains as well, analogous to the work items and resources blockchains.

Figure 2:
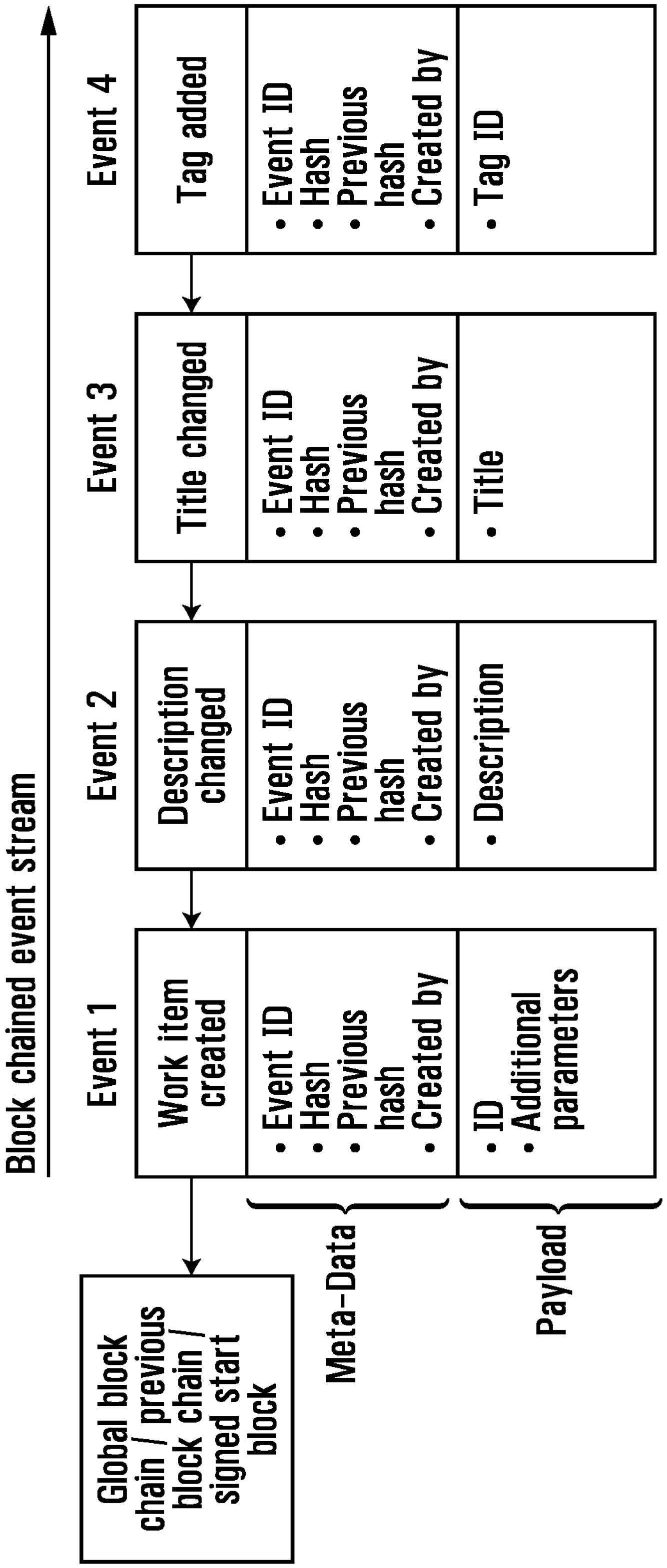
FIG. 2 is an illustration of an exemplary blockchain structure for a work item comprising all changes with regards to the work item.

Work item blockchains may contain all changes regarding the work item as well as auxiliary assignments (tags, location, category, attachments, etc.) and resource assignments. FIG. 2 is an illustration of such an exemplary blockchain structure for a work item comprising all changes with regards to the work item. In FIG. 2, the first event is the creation of a work item block inside a blockchain, which may be part of a global blockchain, part of a previous work item blockchain or a brand new blockchain which may comprise an initializing block (i.e. a signed start block). The first block of this work item blockchain may include all necessary metadata (e.g. identifier, hash signature of the previous block, information on the block's creator, hash signature of the current block, timestamp, etc.) and a payload which may include all necessary parameters defining the work to be done in this work item.

The example of FIG. 2 shows a second event, in which a change of description of the payload of the initial work item block is made and thus registered as a second block in the work item blockchain. Similarly, a change in the title and the addition of a tag characterizing the work item are each separately registered as new blocks in the work item blockchain. As is known in blockchain technology, each new block of the blockchain includes the hash signature of the previous block, such that undetected data tampering is almost impossible. Any suitable cryptographic hash function may be used to generate the hash signature from the payload data.

The resource blockchains may contain changes limited to the resource itself as well as auxiliary types (availability, capabilities, types, etc.). As for the auxiliary type blockchains, it may contain only changes to itself and other auxiliary types.

In some embodiments, there may be an index created to allow quick search functions to find desired data from the different blockchains. This index may be a simple database (e.g. lookup tables) that may be unprotected. Since the index refers to protected data and only serves to retrieve such data without storing any of the protected data in itself, it may not need to be protected. Moreover, if any of the index data is tampered, as may find a user searching for specific data and being referred to unrelated data, the whole index may be recreated by re-indexing all the blockchains.

Figure 3A:
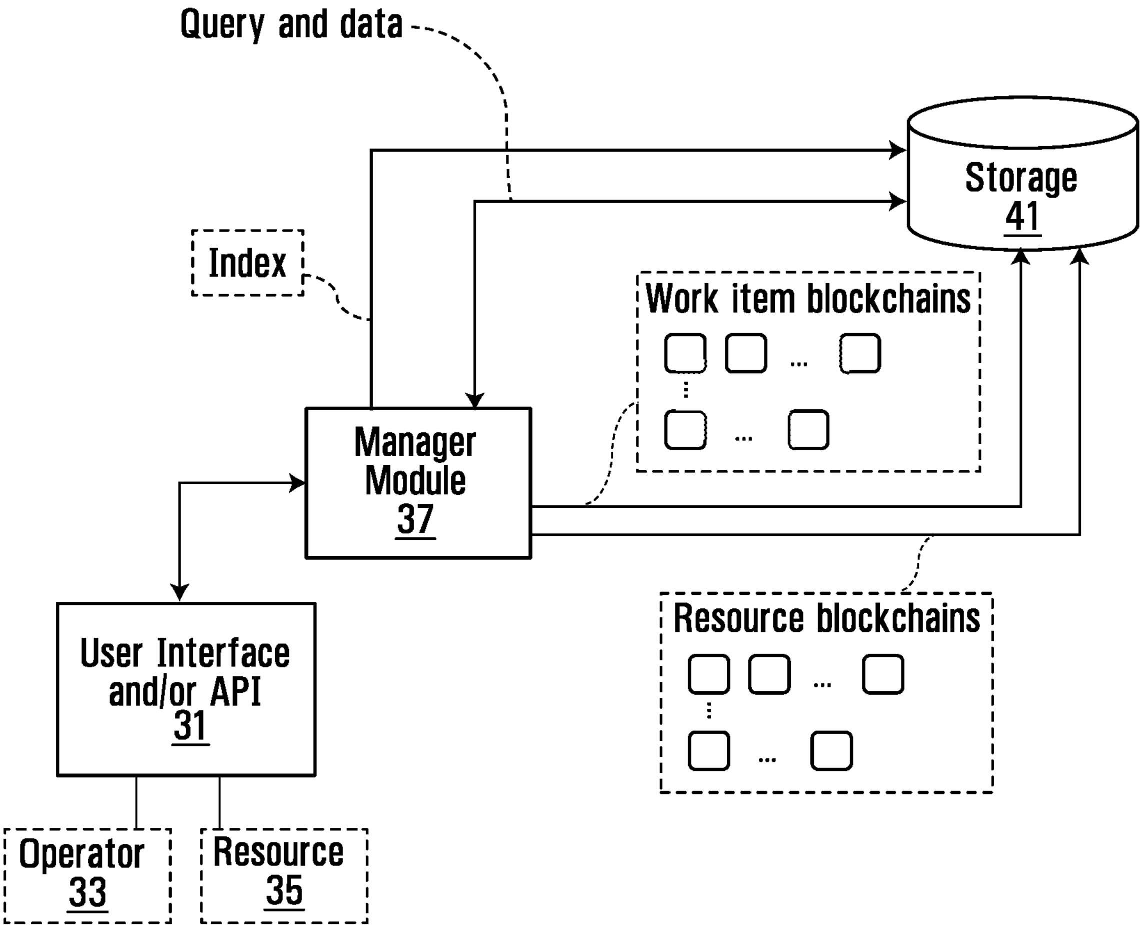
FIG. 3A is a block diagram of an exemplary work and resource data management system showing the main system components.

Now referring to FIG. 3A which is a block diagram of an exemplary embodiment of a work and resource data management system. In this embodiment, some of the major components of the system are illustrated schematically in a modular layout in which some components will be understood to be hardware components, software component or a combination of hardware and software. A user interface and/or a resource API (application programming interface) 31 allows operators 33 and resources 35 to interact with the system's manager module. In such embodiment, the operator 33 may be a human in charge of managing the work that will be recorded by the system. As such, an operator 33 may have a specific user interface 31 for creating a work item to be stored in the work item blockchain. The operator 33 may further enter all necessary information for the work item through the user interface 31. Similarly, a resource 35 may manually enter information for a work item or for its own blockchain through a user interface 31, which may have a specific user interface layout (i.e. access to different functions than the user interface layout accessible to an operator). Both the operator 33 and the resource 35 may access the system through a user interface 31 on a computing device connected to the work and resource data management system. It will be appreciated that each operator and/or each resource may have its own computing device with its own user interface. The computing device may be, for example, a computer connected to a network to which a server running the work and resource data management system's software.

In some embodiments, an operator 33 may have access to modify values from the resources, such that these would be stored in the work item blockchain and/or the resource blockchain without actions from a resource. This may be particularly useful in embodiments of the system where resources may be objects (e.g. tools, vehicles, equipment, etc.) and where the operator 33 may therefore assign these to work items. In some embodiments, the operator may be considered a resource with its own resource blockchain that records the actions of the operator.

The system's manager module 37 may be one or more software modules that are operable to perform blockchain operations in addition to allowing access and visualization of data stored in the blockchains. As such, the manager module 37 receives information to be stored in new blocks in the work item blockchain or in the resource blockchain. Upon receiving such information, the manager module 37 may perform the necessary blockchain operations to add a new block (e.g. create a new block, append the hash signature of the previous block, calculate the hash signature of the current block, etc.) in the relevant blockchain.

The manager module 37 may add as many blocks as necessary in any of the blockchains in order to keep full data traceability for any and all operations. As such, the manager module 37 may create a new block in the work item blockchain and in the resource blockchain at the same time. Although not represented in the embodiment of FIG. 3A, the manager module 37 may further perform any necessary actions to an auxiliary type blockchain if so included in the system's architecture. The blocks of the different blockchains may thereafter be stored in a storage module 41 (e.g. hard disk drive, solid-state drive, or any other suitable storage device, etc.) connected to the manager module 37. The storage module 41 may be in direct physical connection to the manager module 37, such as storage on a server running the work and resource data management system, or it may be a remote storage module 41 (e.g. cloud-based storage).

The manager module 37 may further create an index, which may be stored as a blockchain or as a normal database format (e.g. lookup tables). The index may be representative of the links between the different blockchains (e.g. different resources contributing to a single work item blockchain may all be referred to in the index, under the work item identifier) . Such index may allow for fast data lookup and may be stored in a storage module 41, which may be any type of data storage (e.g. hard disk drive, solid-state drive, cloud-based storage, etc.). The index may be stored in the same storage module 41 as the blockchains or may be stored in a separate data storage module. The index may be updated each time a new block is received or generated by the manager module 37. The index may store the blockchain identifiers, the hash signatures, and optionally the metadata of all the blockchains. The index may further contain all the payload information of all the blockchains. This may allow for fast data retrieval while maintaining the information in parallel in the immutable blockchains, such that the information may be confirmed as being accurate or not.

The manager module 37 may further process data requests from a user (which may be an operator 33 or resource 35 with enabling access rights), such that a data query entered through the user interface 31 may access the results. The manager module 37 may thereafter display the results of the data query as applicable. It should be noted that the manager module 37 may include a verification module to assess the rights of the user performing the data query, such that only authorized data may be shown to specific users.

The manager module 37 may also perform data integrity checks on the blockchains, such as comparing the hash signatures stored on blocks with an expected hash signature value. Integrity checks may be performed at any relevant time, such as when a new block is created or when a query for stored data is made.

The work and resource data management system may be implemented in a single computing device or in multiple computing devices (a computing device may be any electronic device capable of running software and having a type of storage, such as a computer, a mobile device, a tablet, etc.). The user interface 31 may thus comprise at least one display device and an input interface through which the operators and resources may enter the information. For example, the input interface may be a keyboard, a pointing device (e.g. a mouse), a touchscreen or any other means through which a user may input information. The display and input interface may be in a single device or in separate devices operably connected. The manager module 37 may be enabled by a set of instructions that may be executed by a computing device (which may be equipped with a processor, random access memory, memory, graphics card, etc.).

It will be understood by someone skilled in the art that, although described as manual entries through the user interface 31, the system may be operable to register and apportion automatic entries through the API portion of the user interface and/or API 31. For example, the operator 33 may be a software receiving a client request and automatically transferring all required information to the system's manager 37 to create and populate a work item (e.g. an IT ticket manager receiving support requests from clients and collating/relaying this information in a structured manner for the creation of a work item block in the work item blockchain).

Additionally, a resource 35 may automatically upload status changes to a work item and to its own blockchain. As the example presented at FIG. 3B will further describe, a resource 35 may have a mobile computing device connected to the work and resource data management system. The mobile computing device may automatically send localization data and upload a new block to the work item blockchain once it reaches the destination specified in the work item (e.g. a security guard may be on his way to perform a reconnaissance in an area defined by a work item; upon reaching the destination, the system may automatically generate a new block specifying that the resource arrived).

In some embodiments, there is a user interface and an API 31 in order to allow both human interaction with the manager module and automatic system interaction with the manager module. In other embodiments, one of a user interface and an API 31 is sufficient and may thus not necessarily require the other. However, a user interface may be used to access and visualize the blockchains data or to manually enter some additional information not captured by an automatic system.

Figure 3B:
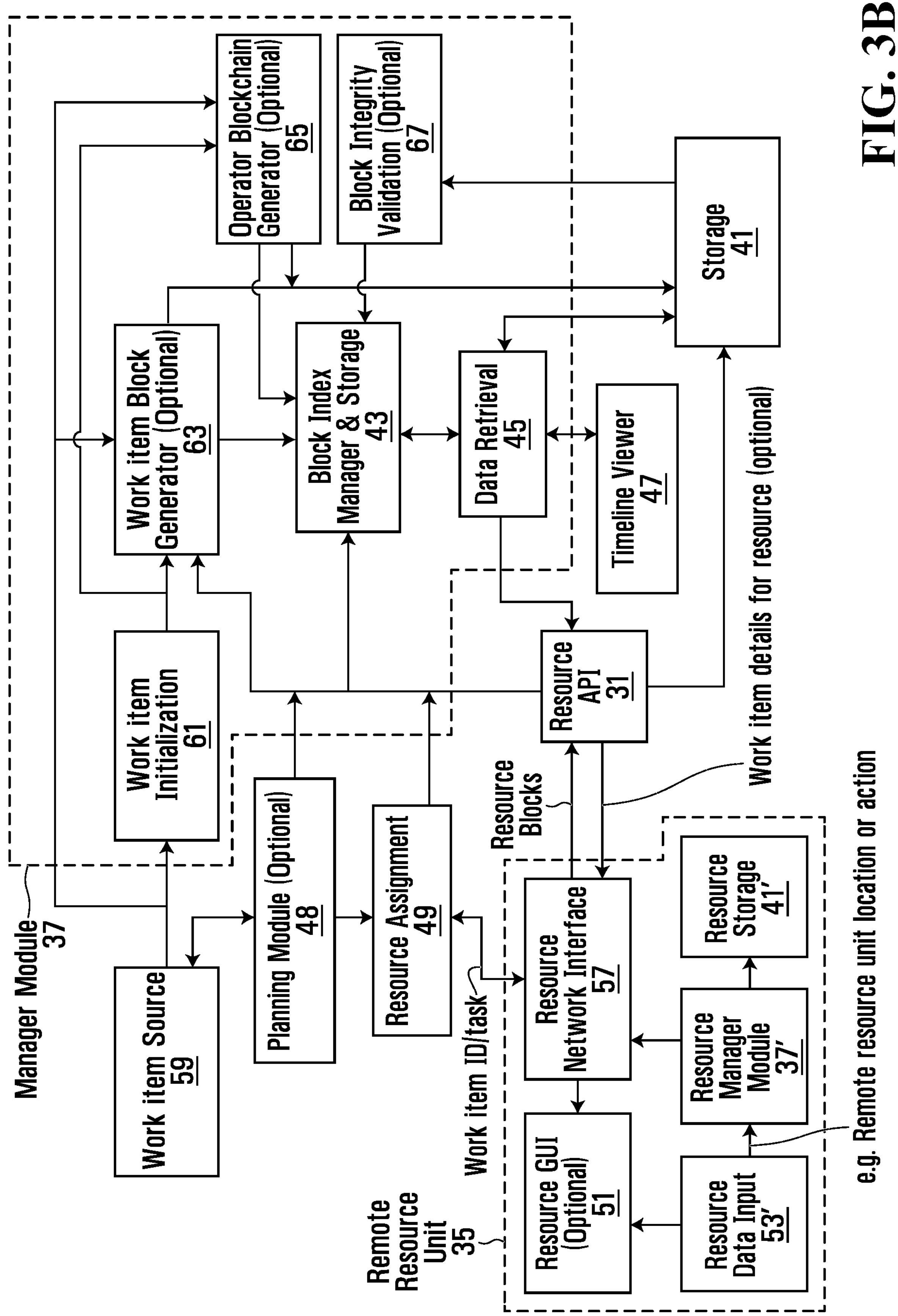
FIG. 3B is a block diagram of an exemplary work and resource data management system showing detailed software modules and a resource connected to the system through a remote unit.

FIG. 3B illustrates a more detailed block diagram of the software modules of the work and resource data management system with a resource equipped with a mobile device which implement part of the work and resource data management system. In such embodiments, each remote resource 35 may be equipped with its own remote computing device managing its resource's blockchain. It will be appreciated that each remote resource 35 may manage a certain state of all blockchains in addition to its own blockchain. This can be done using a full copy of all blockchains or a truncated version of the blockchains (e.g., a number of previous blocks).

In this embodiment, a work item source 59 may create a new work item to be tracked and stored through the work and resource data management system. The work item source 59 may be an operator 33, an API interfacing with another software providing work items, or it may be any other source operable to initialize a work item in the system. The work item source 59 may thus request the creation of a new work item to a work item initialization module 61, which is a part of the system's manager module 37. As described herein, when the work item source 59 is an operator 33, the work item creation request may be done through an operator interface in the user interface and/or API module 31.

The work item initialization module 61 may include instructions, which when executed by a computing device, creates an initializing block for the new blockchain of the new work item. Once initialized by the work item initialization module 61, the data flows in one of a work item blockchain generator 63 or an operator blockchain generator 65. An operator can be considered to be a resource that is associated with dispatch or a control center. The manager module 37 may have only one of these blockchain generators depending on the choice of system architecture. As further described herein, in some embodiments the work item may be tracked and its history stored in a work item blockchain (which may or may not have associated resource blockchains as all the pertinent data for the task may be securely kept in its blockchain), while in some other embodiments the information may all be stored in each resource's blockchain and in operator's blockchains (the operators may also be considered as resources).

The work item blockchain generator 63 or the operator blockchain generator 65 may thus create the block for the new work item blockchain. The generators may create a single or multiple blocks for the blockchain, depending on the information entered by the work item source 59 (i.e. there may be a first block in the blockchain for the title of the task, followed by a block adding information concerning the work item, etc.). The generated blocks may thereafter be communicated to a block index manager and storage module 43, such that the work and resource data management system may create an index of the relations between the blocks of the different blockchains.

Additionally, the blocks created by either blockchain generators 63, 65 may be transmitted to a storage module 41 in which they may be stored. The manager module 37 may further comprise a block integrity validation module 67, which may verify the information contained in the different blockchains to ensure the absence of data tampering (e.g. it may verify the hash signatures of the blocks throughout the blockchain). The block integrity validation module 67 may be operated during the storing of new blocks to the system, during data retrieval, or at any other time. Alternatively, validation of blocks of data retrieved from the storage 41 can be done at the client end if the full block of data is provided to the client.

Figure 9:
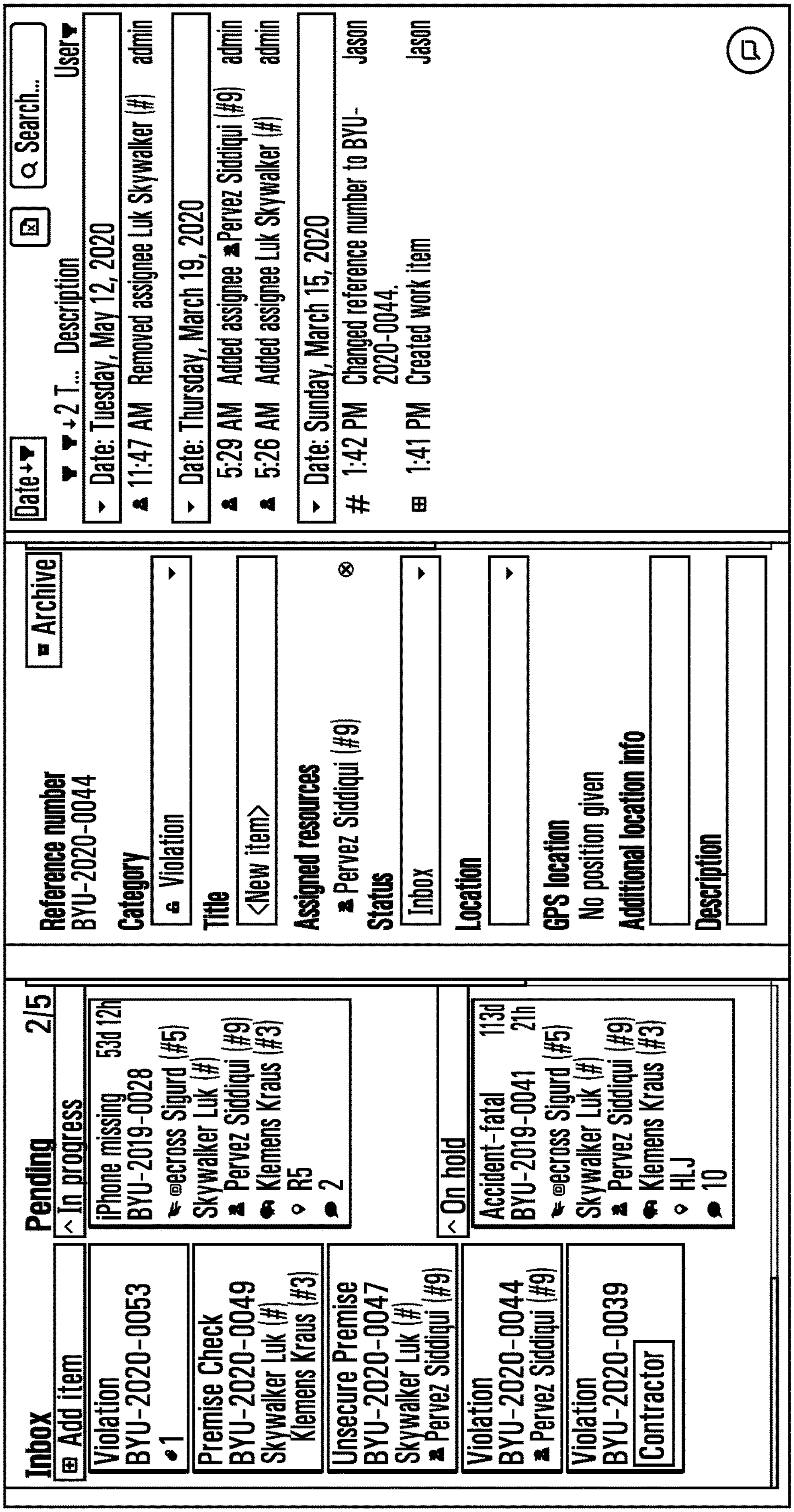
FIG. 9 is an illustration of an exemplary work item timeline viewer display.

The system's manager module 37 may further include a data retrieval module 45, which may receive a data retrieval request through the resource API 31 or through a timeline viewer 47. The data retrieval module 45 may validate the credentials and access rights of the requestor before retrieving the requested data blocks from the storage 41. The requested data blocks may further be checked for integrity by the block integrity validation module 67 prior to being shown to the data requestor. The requested data blocks may be viewed by the requestor at the timeline viewer 47 or on the remote resource device's graphical user interface 51. The timeline viewer 47 may be a graphic user interface on a computing device in which a user may input its data request and view the results. FIG. 9 illustrates an exemplary timeline viewer display 47 as described herein. In such embodiments, there may be dedicated sections of the timeline viewer 47 for each functionalities, such as an inbox to display current work items and their status, a detailed viewer of a selected work item and a timeline view presenting the historic data of the work item.

In some embodiments, the timeline viewer 47 may be operable to display data not only from the work item blockchains but also from the resources and/or the operators. The timeline viewer 47 may thus show data only for a work item, only for a resource or it may show a composite view of one or more work items with their associated resources. These different view modes may enable easier data comparison between the data stored in the work item blockchains and the data stored in the resource blockchains. As such, it may allow for easier investigations of events.

In FIG. 3B, each remote resource device may have its own graphic user interface 51, resource manager module 37', network interface 57 and local storage. This embodiment allows, as will be further described herein, for resources to function disconnected from the network by continuing localized blockchains on each device. These local implementations of the system may function in a similar manner as the described central system. Each localized blockchains may be merged with the central system blockchain once the mobile device is reconnected to the network and to the main work and resource data management system.

The remote resource 35 is equipped with a remote device for tracking task assignment, performance, and completion. Resource data input 53, such as information concerning the performance of a task (e.g. location, actions, etc.), may be generated automatically or manually by the resource. If manually generated, the resource data input 53 may be entered in the resource's mobile device through a graphical interface unit (GUI) 51. The GUI may not be required, specifically in system's implementation in which the resource's mobile device always generates automatically all entries in the work and resource data management system. The data input 53 may thereafter be sent to a resource manager module 37', such that the data input 53 is integrated in the payload of a new block to be appended to the generating resource's blockchain. The resource manager module 37' may be a module similar to the system's manager module 37, integrating all necessary components to generate the blocks of the resource's blockchain, the index, the block integrity validation, etc. Additionally, the remote resource device 35 may also be equipped with a resource storage module 41', such that the blockchains and index may be stored locally. The newly created block for the resource's block may then be transferred to the server or computing device running the work and resource data management system over the network, the communication being done through the resource network interface 57. In some embodiments, the remote resource device 35 may append the newly created block to the resource's local blockchain, which may then be sent to the server or computing device running the work and resource data management system.

In the embodiment of FIG. 3B, the remote resource device communicates to a resource API 31, such that the information being transmitted to the manager module 37 may be properly interpreted and processed. The resource API 31 may be in a two-way communication with the remote device's resource network interface 57, where it may receive the resource data blocks to be stored in the resource's blockchain and it may further transfer work item details for the resource.

Upon receiving a new block from a resource, such as a new block created by the resource manager module 37', the resource API 31 may send a copy of the block to a storage module 41, a block index manager and storage module 43 and to the work item blockchain generator 63. The block index manager and storage 43 may thereafter create an index representing the links between the received block and its associated work item. In this embodiment, the index may be stored in its own storage module (i.e. provided in the block index manager and storage module 43) instead of being stored in the storage module 41. It will be understood by someone skilled in the art that storing the blocks and the index may be done in the same storage module 41 or that when implemented as two separate modules, the information may nevertheless reside in the same physical medium (e.g. hard-disk drive, solid-state drive, etc.).

In the embodiments in which there is a work item blockchain securing all data concerning a work item, the resource API 31 may transfer the information from a resource to the work item blockchain generator 63. As such, any changes to the work item performed by the resource may be the source of a new block to be appended in the work item's blockchain. In some embodiments, the information provided by the resource to the resource API may not necessarily be a block from the resource's blockchain created by the resource manager module 37', but may be unprotected data sent to the manager module 37 to be added to a work item's blockchain through the work item blockchain generator 63.

Each remote resource may further receive work item assignment and information through their resource network interface 57. The assignment information may be provided by a resource assignment module 49 which may distribute the assignment information from the work item blocks and the work item source to the associated resource. The resource assignment module 49 may be operable to exchange information with the resource network interface 57, such that there may be a transaction taking place with the resource before assigning a work item to it. For example, a work item source 59 may assign a resource to a work item. In some embodiments, the resource receives the work item assignment and may not have discretion to accept or refuse the assignment. However, in other embodiments, the resource assignment module 49 may send the assignment to the resource and receive a confirmation whether the resource accepts or refuses the work item assignment. Additionally, the resource assignment module 49 may be operable to allow resources to "pull" a work item from a work item listing and to assign itself to the work item. As such, the resource assignment module 49 may send necessary information to the manager module 37 in order for the system to generate and append new blocks in the relevant blockchains.

Additionally, the work and resource data management system may have a planning module 48. The planning module 48 may be operable to plan tasks in work items and to plan resource assignments. As detailed herein, planning work items may be done through the creation of a blockchain branch in the work item's blockchain. For example, a user may want to assess the performance in the completion of a work item and/or the performance of its resources assigned different tasks in the work item.

The planning module 48 may further be operable to assess resource assignment. As such, the planning module 48 may determine all resource constraints (e.g. availability, capabilities, qualifications, etc.) to evaluate if a resource may adequately perform the work of the work item. The planning module 48 may be in communication with the work item source 59 in order to provide a list of adequate resources that may be assigned for a particular work item. Moreover, the planning module 48 may further consider the impact of assigning a resource to the work item with respect to any planned future work item needs and the availability of the resource. Artificial intelligence may be used in order to predict the needs for specific resources ahead of time, based on past assignment and/or on the cumulative list of currently active work items. For example, the planning module 48 may consider the assignment of a resource, such as a vehicle, for a task of a work item that is planned to last a given amount of time. The planning module 48 may decide not to assign the resource considering the needs of another work item (e.g. a priority work item) that may arise during the planned amount of time of task of the current work item. The planning module 48 may thereafter assign a different resource and may provide related messages to a system user.

As illustrated in FIG. 3B, the planning module 48 may communicate the resource assignment to the resource assignment module 49, such that it may further be transmitted to the resource as described herein. The planning module 48 may also be operably connected to the manager module 37, such that it may provide assignment information to be added to the related blockchains and may receive any necessary information relating to planned work and current blockchains.

As described herein, some embodiments of the work and resource data management system may not necessarily use a blockchain for each type. For example, a similar degree of data protection may be achieved by simply having blockchains for each of the resources and blockchains for the users or operators (which may themselves be part of the "resources") creating and modifying the work items. In such example, the work items themselves may not necessarily be stored in their own blockchains, but instead the work item data retrieved from other blockchains could be registered as a normal database (e.g. similar to the index) for immediate access. It will be appreciated, that the data can alternatively be stored in work item blockchains only without using resource blockchains, with resource data being retrieved from the work item blockchains and optionally placed a normal database. In this exemplary work and resource data management system, every modification to a work item would be registered on the blockchain of the person/resource effecting it (e.g. creation and initial work item description may be stored on the user/operator creating the work item, performance of a task related to the work item may be stored on the blockchain of the resource performing the task, etc.). As such, in those embodiments, the work item records may act as the index referring to the related blocks in the blockchains from users and resources.

Figure 3C:
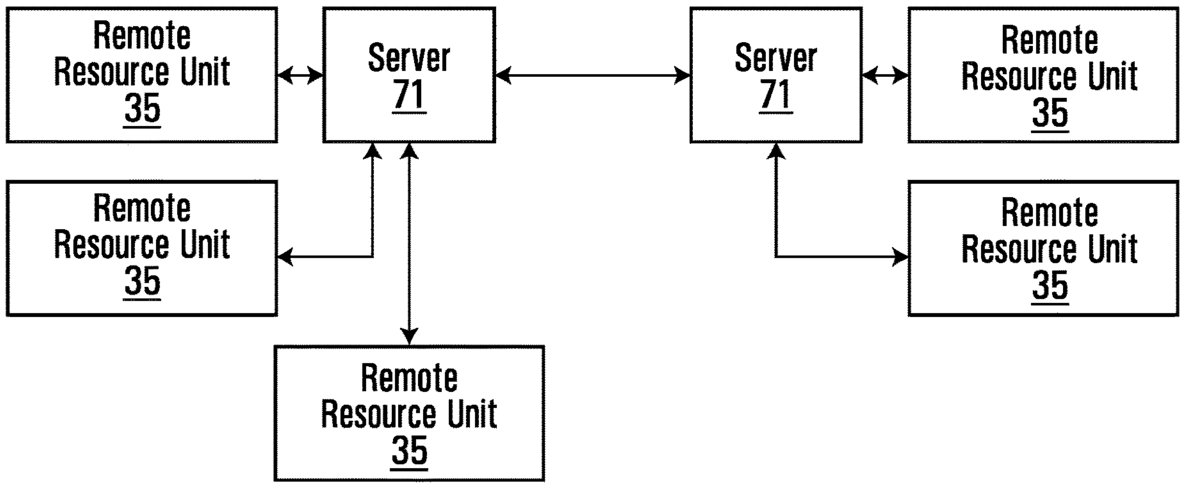
FIG. 3C is a block diagram of an exemplary distributed work and resource data management system in which a number of servers and remote resource units are in communication.

Reference is now made to FIG. 3C, which is a block diagram of an exemplary distributed work and resource data management system. In this embodiment, there may be any number of servers 71 and remote resource units 35 in communication. The servers 71 may be data centers distributed in any area throughout the globe and part of the same network. As such, there may be no single central system running the work and resource data management system. Each server 71 connected to the network may run the work and resource data management system and replicate the information of each other servers 71. Remote resource units 35 may be connected to the server 71 to which they are assigned (e.g. to the server providing service in their geographical zone, to the server dedicated to the resource's direct affiliation, to the server with which they have the least latency, etc.). It will be understood by someone skilled in the art that such architecture may further allow remote resource units 35 to connect to a server 71 to which they are not usually assigned to in case of server malfunction, maintenance, connectivity issues, or for any other reason for which their usual server may not be responsive.

Similar to the remote resource units 35 being operable even while out of sync (e.g. operating offline or with latency), as described herein, the servers 71 may operate even while out of sync. As such, the servers 71 may operate independently of each other and sync their stored blockchains with the other servers 71 once reconnected to the other servers 71. Therefore, there may be issues in the blockchains due to this potential asynchronous operations. For example, a first resource, on a first server, may work on a work item and update the status of the work item (in the work item blockchain) while a second resource, on a second server, works on the same work item. The second resource may also have updated the status of the work item at a similar time and based on the same initial block as the update from the first resource. However, the first and second servers may have connectivity issues and neither the first nor the second resource may be made aware of the updated status of the work item. Thus, the work item's blockchain stored in the first server and the one stored in the second server may have conflicting information needing to be resolved, as further described herein.

In some embodiments, the servers 71 and the remote resource units 35 may be implemented with the same or similar functionality and/or modules. For example, the remote resource units 35 may be mobile computing devices with the same modules of the servers 71 running the work and resource data management system described herein.

Someone skilled in the art will appreciate that the examples illustrated in FIGS. 3A to 3C are simplified examples for illustration purposes only, and that the system implementation may vary depending on practical implementations, that some modules may be combined, some modules may be omitted and other modules may exist.

General Functions of the System

Figure 3D:
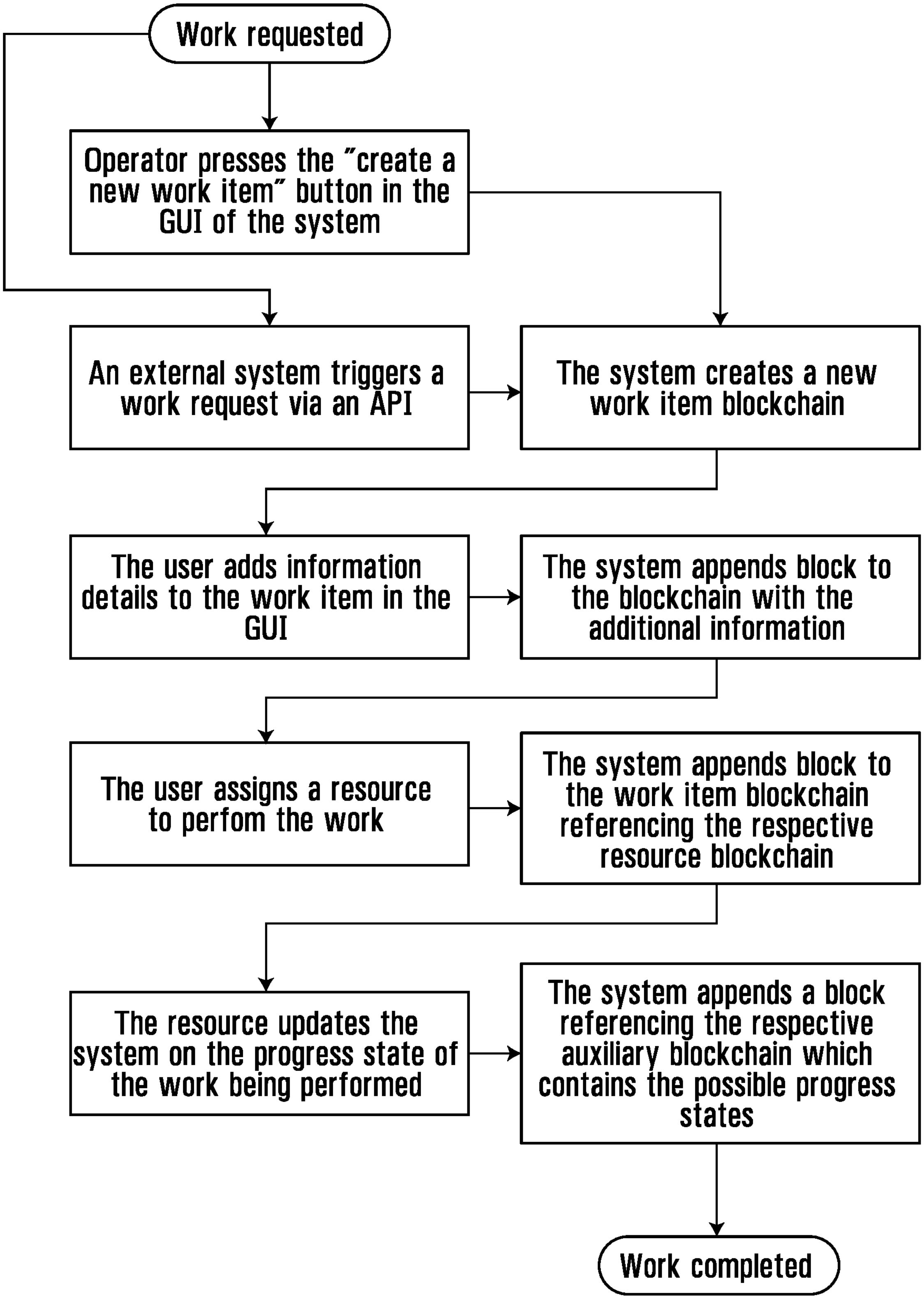
FIG. 3D is a flow chart of an exemplary work item life cycle from the work request to the work completed.

Reference is now made to FIG. 3D which is a flow chart of an exemplary work item life cycle from the work request to the work completed. The flow chart of FIG. 3D is a representation of the general functions of the preferred embodiment of the work and resource data management system.

The system starts by receiving a request to create a work item from a work item source 59. In some embodiments, this request could be initiated by a human (e.g. a real-world event occurs, such as an incident that is called-in to an operator 33, and the operator 33 identifies the type of work item that is needed to respond to this event by creating a corresponding work item in the system). In some embodiments, this request could be computer generated (e.g. a computer-generated trigger from another system occurs, such as by an automated workflow following a system event and a work request form may be filled out in another system, when a telephone call is received by the system and answered by the operator this may trigger a request to create a work item, etc.).

The system may then initiate a new starting block for the work item. The blockchain may be initialized by referencing a signed start block. A signed start block means that the block is cryptographically signed by an external trusted system (e.g. a certificate authority signing the block by using SHA256 and time of signing). Accordingly, the signed start block may comprise a signature by the external trusted system and a timestamp of the time of signing by the external trusted system. Alternatives to initializing the start of a new blockchain are described further herein.

Information may be added to the work item by the operator or user through the user interface. Information may be added to the work item automatically by the system. For example, a recording of the telephone call with the operator may be automatically stored in a block of the work item blockchain. Any change and addition to the work item information is done by appending incremental blocks to the work item blockchain. Thus, the entire evolution of the work item is securely stored and the whole history may be revisited at a later time during any investigation.

Figure 4:
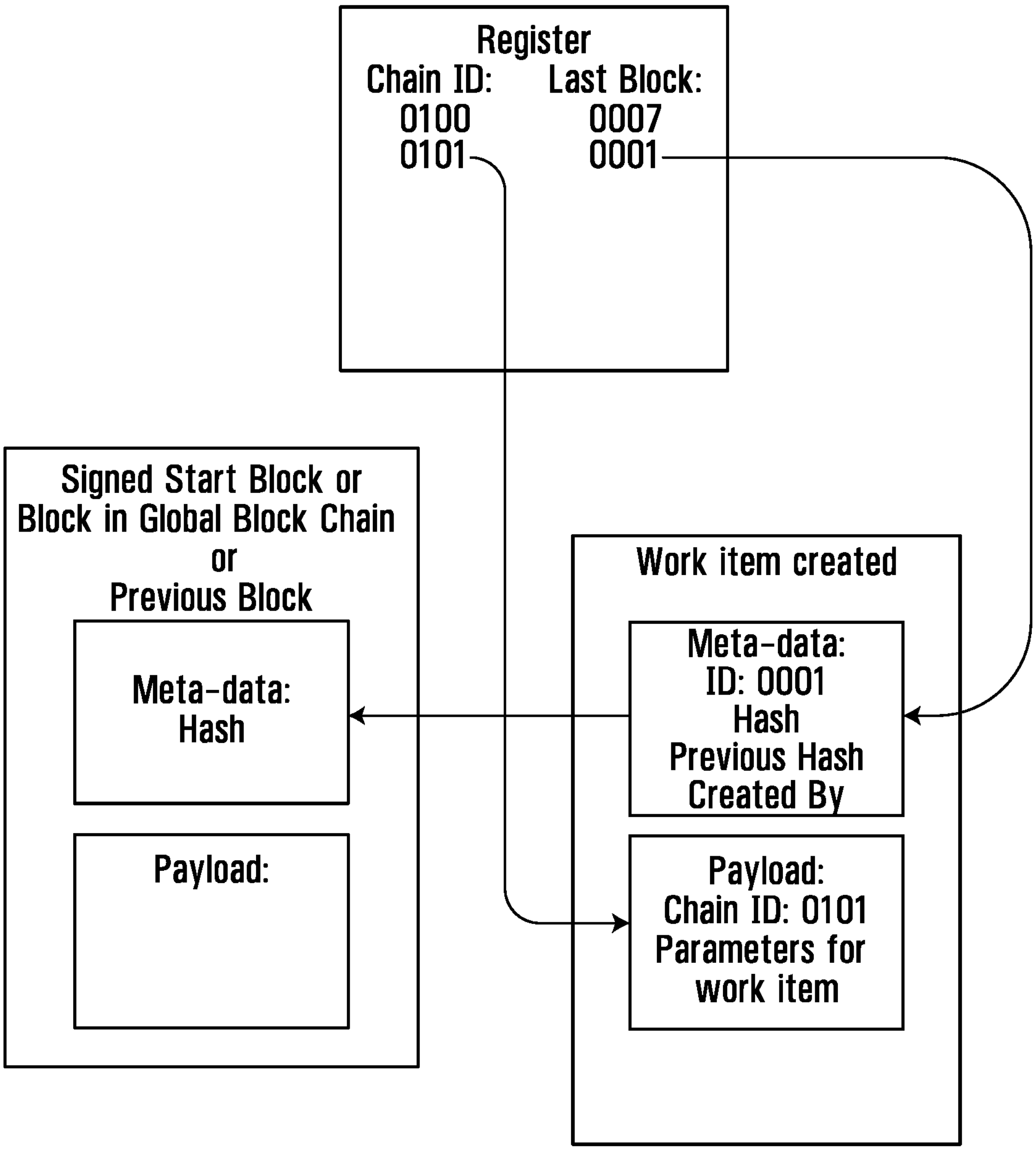
FIG. 4 is an illustration of an exemplary blockchain structure for a work item with a central register.

An exemplary blockchain structure for a work item is shown at FIG. 4. In this embodiment, the new work item is assigned an identifier (0001). A block's identifier may be assigned by the system in any way, such that incremental identifier, randomly generated numbers (e.g., Globally Unique Identifier (GUID)) or randomly generated alphanumeric identifier may be assigned to every block. A central register may store the information of which number has already been assigned to existing blocks, such that no two blocks of a blockchain may have the same identifier. In some embodiments, a central blockchain is used and thus the system needs to generate a Chain ID for the work item and store this information in the payload of the block of the central blockchain. The register may be a blockchain (e.g., the central blockchain) or a database (e.g. lookup table). The register may be implemented as part of the index or separate therefrom.

In the flowchart of FIG. 3D, the addition of information or changing of any information may happen in any order and any number of times throughout the life cycle of a work item. As such, information relevant to performing the work detailed in the work item is added into the work item blockchain as appended blocks. Additionally, changes in the assignment of one or multiple resources for completion of the work item may be stored in the blockchains, whether if the resource is to complete the items of the work item or be used in completing these items. In this embodiment, the system creates a block in the work item's blockchain referencing the respective resources' blockchain. That is, each resource blockchain has an identifier (e.g., a blockchain ID number) and this identifier is stored in the payload of this new block of the work item blockchain. In some embodiments, the identifier of the resource's blockchain corresponds to a user identifier for the resource.

The assignment of resources may be triggered in a number of different ways. For example, an operator may assign the resource to the work item (i.e. input is received from an operator to assign a specific resource to this task—e.g. select one of an available resource) or the system may assign a resource itself based on requirements for the work item (or a given item in the work item) and availabilities, capabilities and/or qualifications of the resource. Alternatively, the manager module of the system may make one or more suggestions of resources that may thereafter be selected by the operator. For example, the system may compare the requirements for the work item to the availabilities, capabilities and/or qualifications of a plurality of resources to suggest one or more resources that meet the requirements of the work item. Additionally, the resource may assign itself to a work item (i.e. the person "pulls" the work item, as would be the case for an IT ticket system in which a technician may select his next work item from a pool of IT tickets). For example, the resource user interface 51 may display a listing of available work items and the resource may request to perform a select work item via the user interface 51.

Figure 5:
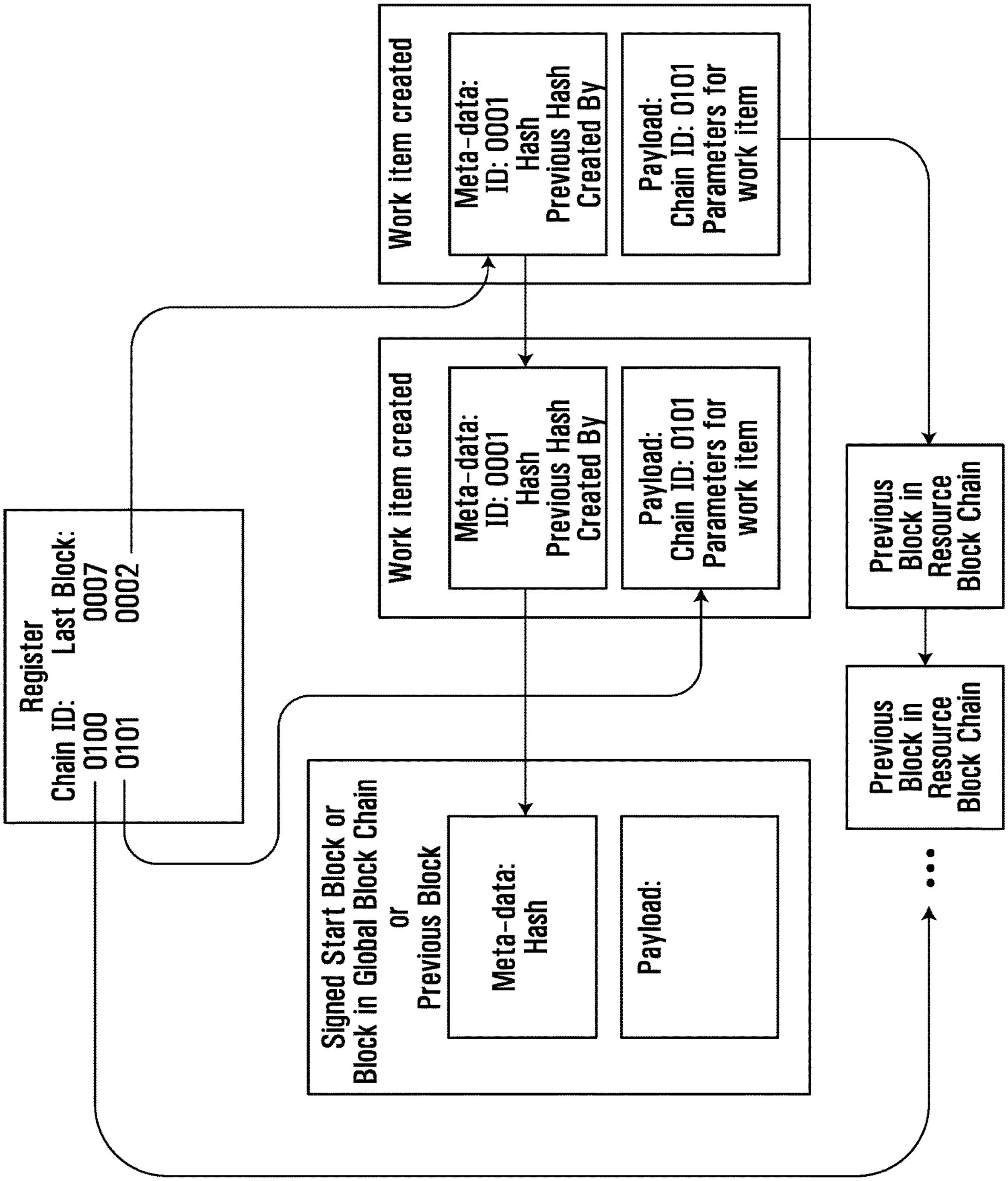
FIG. 5 is an illustration of an exemplary blockchain structure for a work item with a central register and a resource blockchain associated with the work item blockchain.

FIG. 5 illustrates an exemplary blockchain structure for a work item with a central register and a resource blockchain associated with the work item blockchain. In this embodiment, the work item blockchain of FIG. 4 is modified by the assignment of a resource to the work item. As such, a new block (with an identifier number, ID 0002) is appended to the work item blockchain after the first block. The new block in the work item blockchain stores the identifier of the resource's blockchain in the payload of the new work item block, such that it will be possible to identify the identity of the resource performing the work under the work item. In some embodiments, the manager module of the work and resource data management system will further generate a new block in the resource's blockchain to indicate that the resource is assigned to a work item (referencing the work item's blockchain identifier).

Referring back to the flowchart of FIG. 3D, any further modifications to the blockchains may be done when there is a change in the state of a work item (e.g. once the work begins, resources are "en-route", work started, waiting for approval, etc.). Following this change in the state, the manager module of the system may append a block that references the respective auxiliary blockchain. Addition of any further data to the work item (e.g. a mobile application could be used to feed data status of the task or resource, witness statements, photos, videos, etc.), also result in appending incremental block containing this information. Modifying the date of the work item would also be done through appended blocks. This may be done independently of the work item state that may be shown on certain user interface views, for which the system could only show the latest state of the work item. The remaining information with all changes may not be relevant in normal situations but is nonetheless securely stored in the blockchain to enable historic reconstruction of all events. Therefore, any addition or changes to any state of data is stored in its own block in each relevant blockchain and may be independently retrieved and reconstructed to offer different views on the evolution of an event (e.g. data stored in a resource blockchain on a particular work item may offer insights if there are differences with this particular work item blockchain records).

Figure 6:
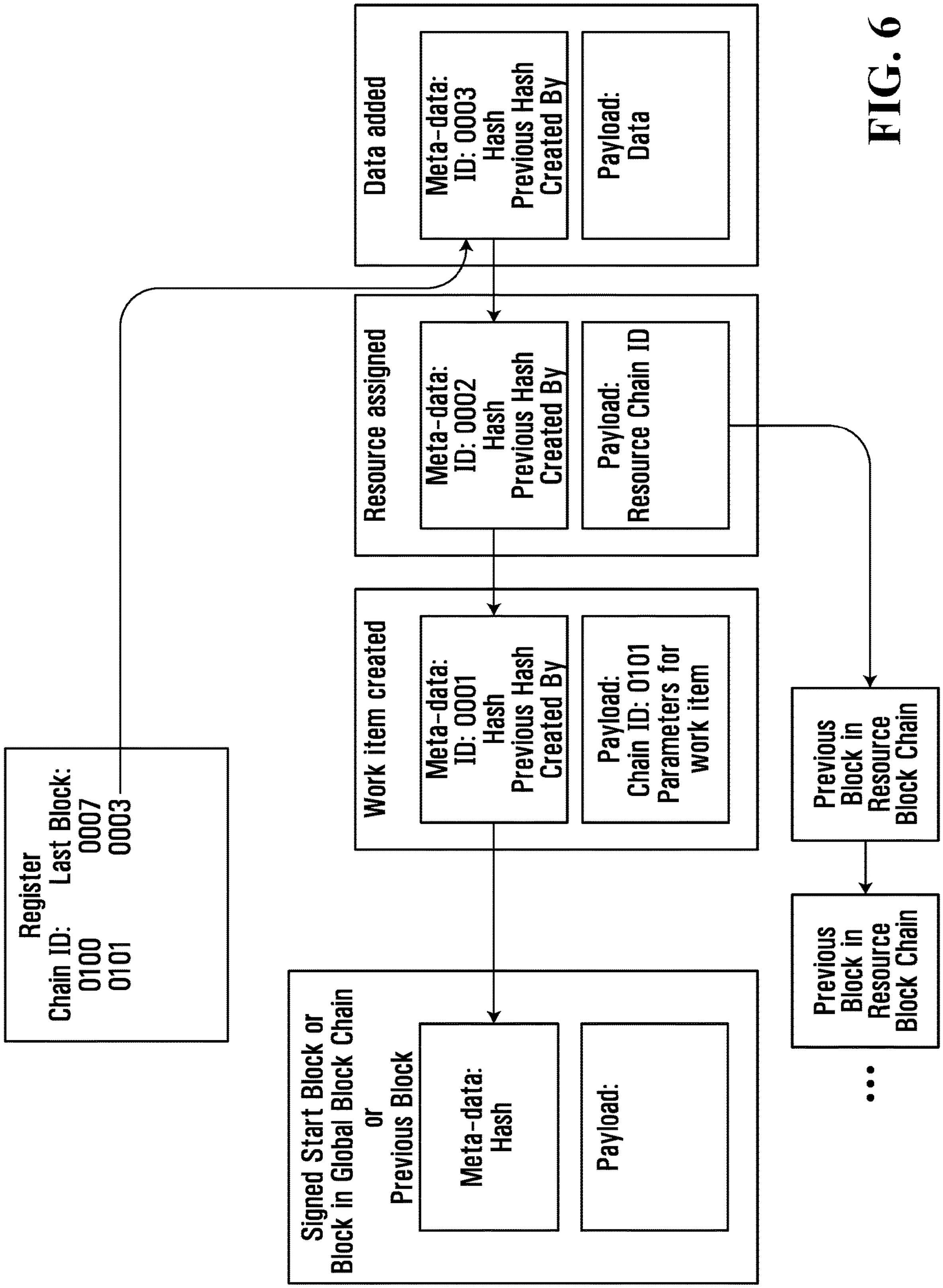
FIG. 6 is an illustration of an exemplary blockchain structure for a work item with a central register and for which a resource has been assigned and data has been added.

FIG. 6 illustrates an exemplary blockchain structure for a work item in which data is added to the blockchain after a number of events happened in the blockchain. In this embodiment, the blockchain of the work item presented in FIG. 5 is expanded by the addition of data to the work item. This addition of data may be done, for example, by the resource that had been assigned to the work item in the previous event of the blockchain. In order to add the data inside the blockchain, the manager module creates a new block in the work item blockchain, with a new block identifier (ID 0003). As detailed herein, all blocks further have, at a minimum, the hash signature of the previous block and their own hash signature in their metadata. The data to be stored in the block may be added in the block's payload, thereafter being used in the hash signature calculations for the current block.

Figure 7:
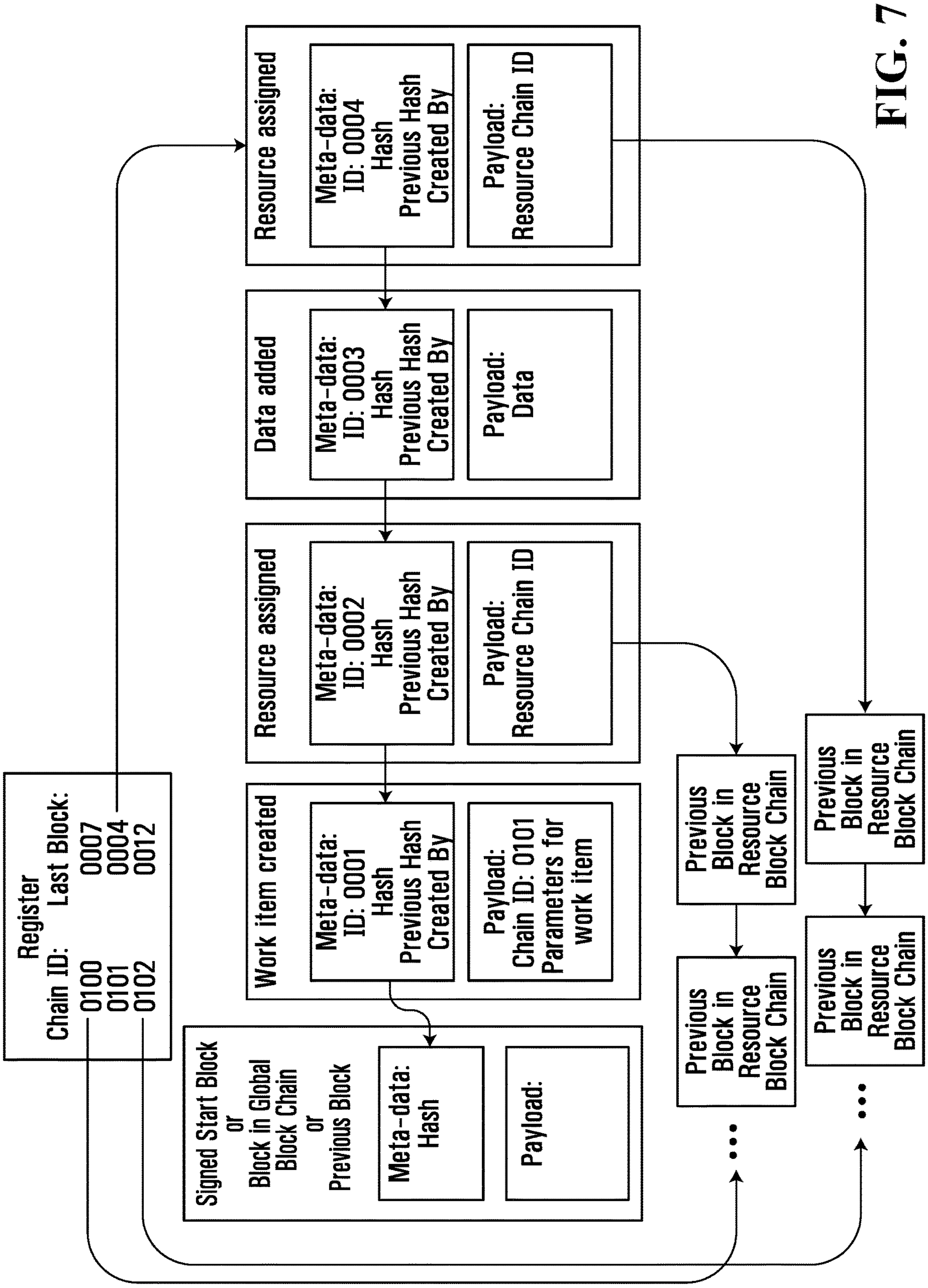
FIG. 7 is an illustration of an exemplary blockchain structure for a work item with a central register and for which two resources have been assigned and data has been added.

Similarly, FIG. 7 illustrates the exemplary blockchain structure for the work item previously described at FIG. 6, in which a new event takes place. Following the addition of the data in the work item's blockchain, the work and resource data management system's operator may assign a new resource to the work item. As such, the work item's blockchain is modified by way of sequentially appending a new block. This new block may thereafter reference the relevant resource's blockchain identifier, which may be a different blockchain than the resource that had initially been assigned to the work item. For example, the operator may assign a computing device resource (ID 0004) for the performance of the work item by the first resource (ID 0002), which may be an officer. In some embodiments, for which blockchains are further enabled for each resource, the assigned resources' blockchains may be modified to have new blocks appended when relevant. In the previous example, the computing device resource's blockchain would be updated to store the assignment to the work item. The blockchain of the first resource may also be updated depending on the impact it has on the first resource (e.g. new resource that may be used by the first resource, new resource helping the first resource, etc.).

Any blockchain creation or appending of a block may be considered an event, which may be identified with an event ID. The blockchain therefore corresponds to a timeline of the actions and status of the resource at each item of the work item, thereby providing an accurate and verifiable record of events. That is, blocks are only added to the blockchain and never removed, which effectively maintains an audit trail. As is common in blockchain technology, untraceable modification of existing blocks is prevented by adding in each new block a timestamp, a cryptographic hash signature of the previous block, and a hash signature of the payload of the current block. Going back and changing a block would make it no longer correspond to the next block's hash signature. In other words, a complete historical record is maintained such that the system can be used to see the state of the task and the resource(s) at any point in the past to revisit what was happening when and allowing users to see why certain decisions were taken.

Temporary Loss of Connectivity, Network Latency and Offline Mode

Operations of a complete system with numerous users that may be located in different areas may bring several challenges for the system. One such potential issue is that it may not always be possible for all users and their devices to stay connected to the system. Therefore, working from disconnected mobile devices needs to be accounted for and there needs to be a way to resolve conflicting modifications that may happen during the offline period of the devices.

Another potential connectivity issue may be latency (e.g., high latency or low latency) over the network. While still being connected and "online", a user may experience severe latency in the network communication, which may lead to conflicting information being registered on the blockchain. For example, an update to a work item may have been done by a first resource which conflicts with the work being undertaken by a second resource. If the second resource is experiencing latency, it may be possible for this resource to perform its work based on the information available prior to the first resource's latest update. As such, the second resource may update its own blockchain based on its task and a conflict may arise between this update and the update from the first resource. As described herein, the connectivity issues may similarly affect servers in a distributed server system architecture.

In order to allow the conflict solving for offline modes, each device may keep a local copy of all up to date blockchains, while the defined servers (typically with the highest availability) may be considered as "master blockchains". Each device may run a version of the work and resource data management system, such that each device may include a user interface, a manager software and storage capacities. Once a device goes offline, it may continue to work on the latest local copy of the blockchain stored in its storage. Thereafter, the local users of the devices (e.g. operators or resources) may continue to work and create changes that are stored in a local blockchain, through their local manager module.

Once reconnected to the network and the main work and resource data management system, all changes made by offline local users may be merged back and taken into the master blockchains (i.e. the local work item block item blockchains may be merged in the master work item blockchain, and similarly for resources and auxiliary types blockchains). In the case of latency users, asynchronous changes may also be merged back and taken into the master blockchain.

However, conflicting changes may have been made during the offline time (or during latency periods) of one or more resource devices (e.g. two resources working independently on a single work item without knowledge of the other may have completed unreconcilable items for the work item). A person skilled in the art will appreciate that there are multiple strategies to deal with conflicting information in different blockchains, such as policies to define how certain users may overrule others and manual conflict resolution (certain users may decide on an event-by-event consideration). Every change, even if it is overruled by another user and thus discarded, is nevertheless recorded in the "master blockchain" and may thereafter be recorded in all blockchains. As such, records are kept of all that may have happened during the offline period of any devices.

Figure 8:
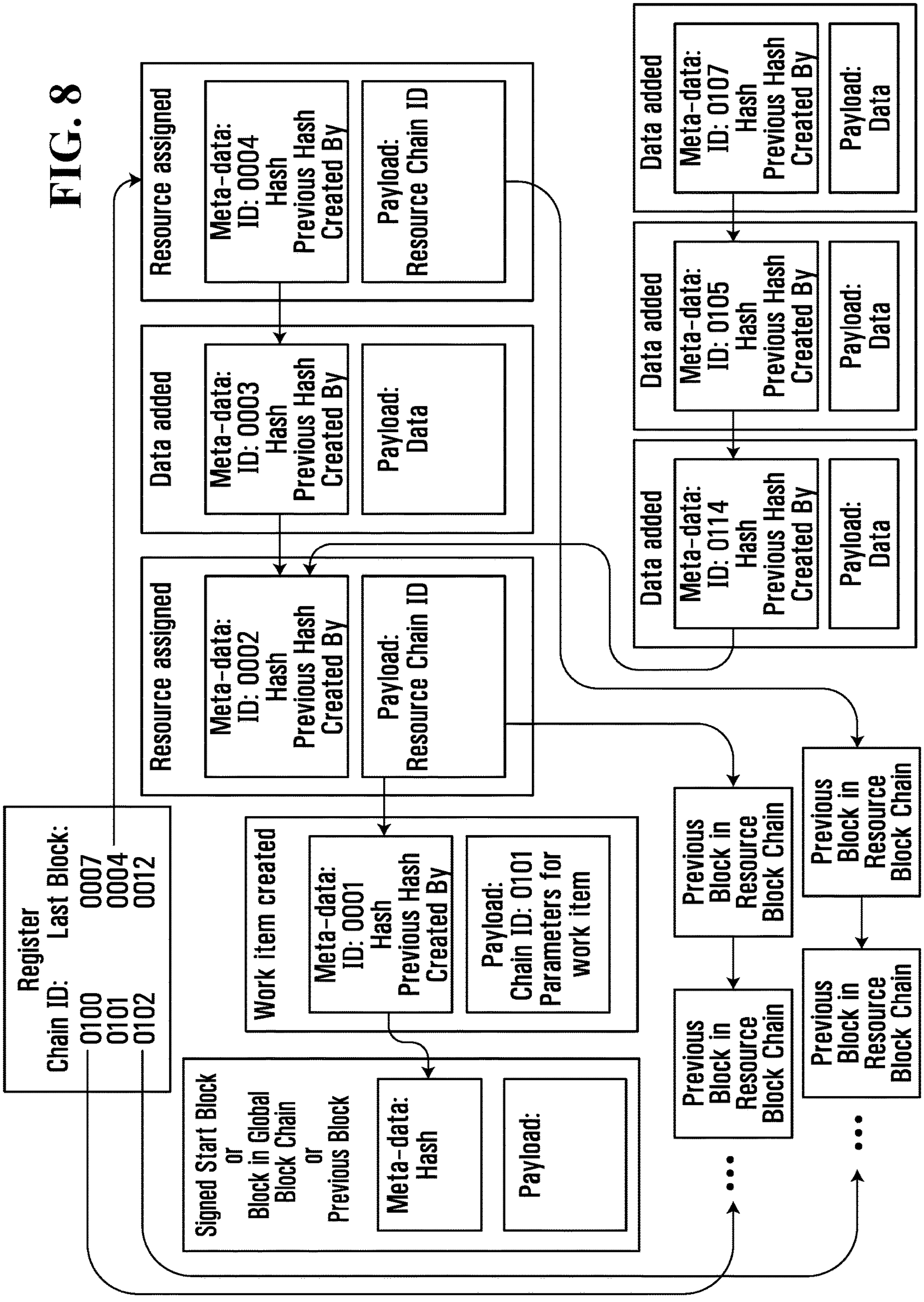
FIG. 8 is an illustration of an exemplary blockchain structure for a work item with a forked blockchain representing a resource working offline.

FIG. 8 illustrates an exemplary blockchain structure for a work item with a forked blockchain representing a resource working offline. In this embodiment, the first resource assigned to the work item performed tasks while being disconnected from the network. Therefore, when properly equipped with mobile computing devices that may function in an offline mode, the resource's computing device may have stored a number of new events, for the work item blockchain, in its local storage. The example of FIG. 8 shows an offline update of three separate events in which the resource has uploaded new data in its localized work item blockchain. Upon reconnection to the network, thus regaining access to the main blockchain, the system may detect that there is a fork. This detection may be done by comparing the previous hash signature of the first new block to the last block in the work item blockchain according to the register. If they are the same, then the offline storage of new blocks can be directly uploaded to the main blockchain without further modifications or considerations. However, if different, it means that the main work item blockchain stored new events while the resource's offline events were happening in parallel.

For example, the resource's computing device obtains the hash signature of the previous block for the work item blockchain that it wants to add a new block thereto. The resource's computing device could attempt to obtain this from the system, but upon failure to connect or receive the previous hash, the previous hash could be obtained from the local memory of the resource's computing device. Thereafter, the resource's computing device creates one or more new block for the work item blockchain locally as it is not connected to the system, as illustrated by the fork in FIG. 8. Before the resource's computing device can reconnect with the system, at least one new block has been added to the work item blockchain. Upon reconnection, the resource's computing device transmits the one or more new blocks to the system, the transmission including at least the blockchain identifiers for the work item and the new blocks to be added.

The system may then add the one or more new blocks to the work item blockchain, which may then detect the presence of a fork in the new blocks as the previous hash signature of the first new block points to a block which may not be the last block in the work item blockchain according to the index. In response to detecting the fork, system could choose not to update the Last Block in the index. Alternatively, the system could update the Last Block in the index to refer to the (last) new block transmitted. How the index updates the Last Block may be implementation specific.

In addition to storing the blocks with the timestamp at which the blocks were created, the system may store a timestamp of the time that the blocks are stored in the system. This second timestamp may be stored in the metadata of the block or stored elsewhere. There may be two hashes for a block, one with the first timestamp and the other with the second timestamp. The first hash may be generated from all the data of the block in addition to the first timestamp and the second hash may be generated with all the data of the block in addition to the second time stamp.

In the case that no block was added during the offline time (latency time, or any other connectivity issues), then the system may update the index such that the last block ID is the ID of the last block of the newly added blocks. However, in some embodiments, even if a block may be added while the resource is experiencing connection issues, the system may not generate a fork. This may be policy driven (i.e., policies that determine whether a fork should or should not be generated) or based on human intervention. For example, the system may indicate to the resource that transmitted the blocks that the blocks are out-of-date and ask the resource to generate new blocks and retransmit them to the system in order to thereafter add them to the blockchain. In other embodiments, the system may regenerate these blocks before adding them to the blockchain. The work and resource data management system may nevertheless keep all the received out-of-date blocks stored in the storage 41 as separate blockchains (i.e. as a forked or branched blockchain), or store them in any other place (e.g. in a database).

Timelines

The system can always provide a view into the current state and the evolution (timeline) of any item in a blockchain. Given this, it is possible to go back in time, to any moment in time, and investigate the situation, the state of knowledge and the decisions being made at that specific point in time based on the available information at the time, as well as to create one or multiple plans for the future of the respective item.

Looking Into the Past of an Item

When the entire system has always been online (e.g. including all mobile devices) and experienced virtually no network latency, each item has a single continuous timeline. In case certain parts have been disconnected, they may all continue their own "local" timeline that may later be merged back into the main timeline as described herein. This results in a forking of the timeline (for each instance of offline period) which may be visualized and investigated. For example, the mobile device of an officer lost connectivity and didn't get an update to abort a certain work item, where the officer in the command center set the state of the item to "abort". The officer continued to perform the work item based on his "local" state of knowledge at that time. Upon completion of the work item, the officer may set the state of the relevant work item to "completed" through the user interface on his device. At reconnection, the device sends its local updates to the server, where conflicting states will be detected and resolved. However, the entire history of this forking into "local" state-of-knowledge and the resynchronization is kept and can be investigated.

Work Item and Resource Planning

Analogous to going back in the timeline, one or multiple future timelines can be created to plan ahead. Each of these future timelines can be branches to the main timeline. Later, after the planned time passed, these "planned future branches" can be compared to what actual timeline that happened, to get a detailed plan/actual analysis. For example, the system may receive a request from the operator 33 via the user interface 31 to create a branch for a selected work item blockchain. The system may accordingly generate a secondary "branched" blockchain for the work item blockchain. The branch blockchain comprising blocks generated as per the instructions received by the operator 33 to create a planned timeline of events. The primary branch of the work item blockchain would be used to record the work performed. After various work has been performed for that work item, the system may receive another request from the operator 33 via the user interface 31 to compare the secondary branched blockchain for this work item to the actual work performed as stored in the main branch of the work item blockchain. The results of the comparison may be displayed via the user interface 31.

Examples for such planned timelines could include: planning for a set of work items (a project) to be finished at certain times, planning for vacation times of staff, planning recurring maintenance of tools or vehicles, etc.

Given historical data in the system, machine learning algorithms could be employed in order to support the planning process. For example, the expected time it takes to complete a certain type of work item, expected maintenance interval of a certain piece of equipment.

Figure 12A:
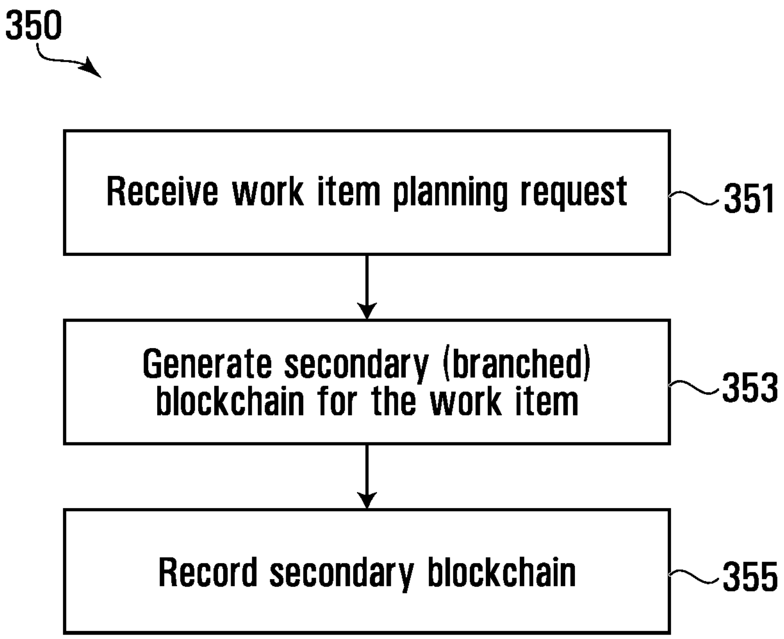
FIG. 12A is a flowchart illustrating an exemplary method of planning the work of a work item blockchain.

FIG. 12A illustrates an exemplary method of planning the work of a work item and of analyzing the completion of the work. The method of planning a work item 350 may thus start upon receiving a request 351 from an operator. The system may then generate a branch in the work item's blockchain 353 which may include all the planned future tasks of the work item. The blocks in the branched blockchain may include any information that may be used to evaluate the performance in the completion of the work item (e.g. timestamps representing expected completion time, information on number of hours expected to be spent on a task, etc.). The new branched blockchain may thereafter be stored 355 in the storage module 41. FIG. 12D illustrates a work item blockchain as a primary or main branch with a planning branch as a secondary branch.

Figure 12B:
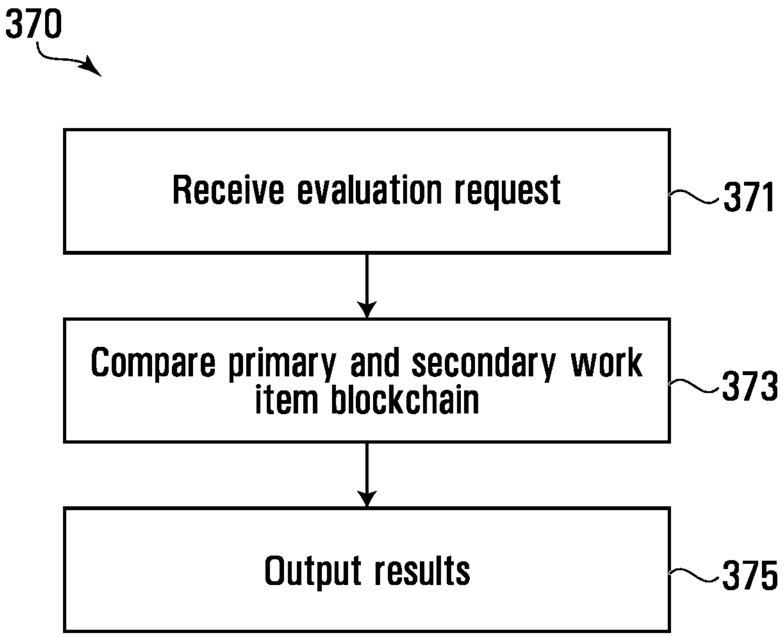
FIG. 12B is a flowchart illustrating an exemplary method of evaluating the work of a work item blockchain.

FIG. 12B presents a method of evaluating the performance of completion of a planned work item 370. The method of evaluating the work of a planned work item 370 may compare the actual completion of each task of a work item with the planned tasks of the work item. As such, following the receiving of an evaluation request 371 the system may compare the primary work item blockchain (blockchain updated by the resources representing the real state of the work item) with the secondary work item blockchain (i.e. a blockchain branched from the primary blockchain representing the work that was initially planned as part of the work item). It will be understood that this comparison may be done inside the manager module 37 (e.g. may be done by the data retrieval module 45) or in the planning module 48 itself. The results may be the output 375 to the operator or user having requested the evaluation. As such, the output data may be shown on a resource GUI 51 (in system's architecture where the operator is also considered as a resource) or it may be shown in any computing device through which the operator or user has input the evaluation request.

Figure 12C:
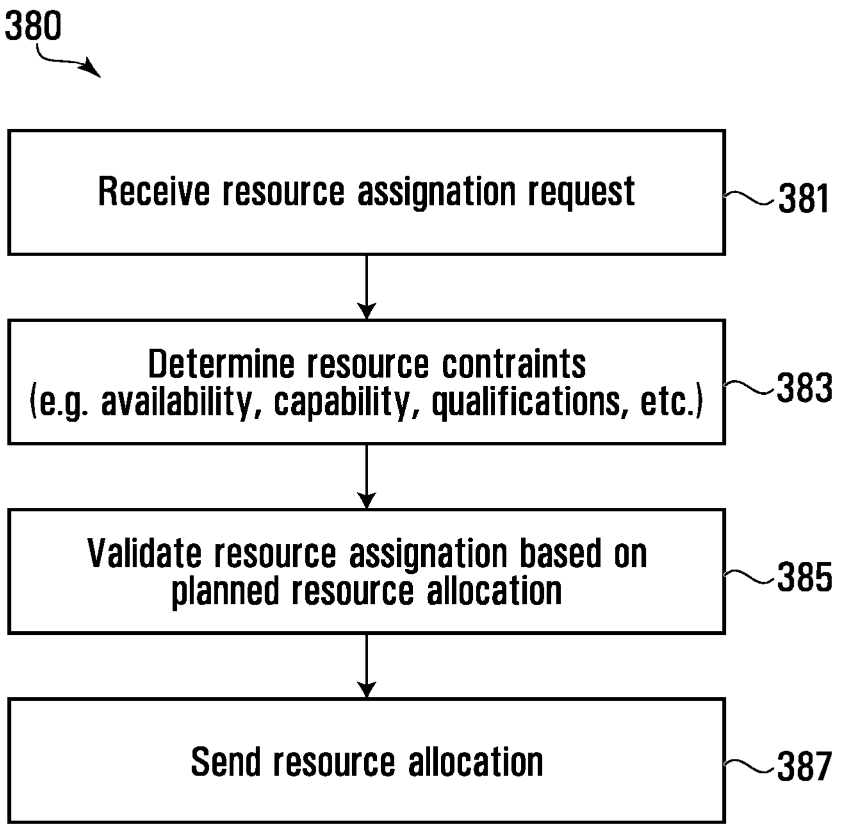
FIG. 12C is a flowchart illustrating an exemplary method of assigning resources and performing resource planning.
Figure 12D:
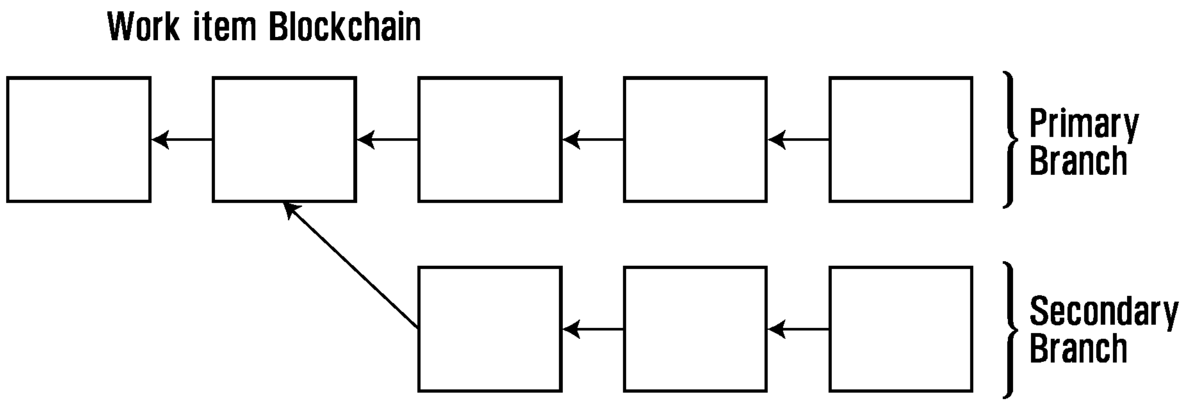
FIG. 12D illustrates a work item blockchain as a primary or main branch with a planning branch as a secondary branch

FIG. 12C illustrates a method of resource planning 380. The resource planning method 380 may be initiated by the receiving of a resource assignment request 381. As described herein, the planning module 48 may determine all resource constraints (e.g. availability, capabilities, qualifications, etc.) 383 to evaluate if a resource may adequately perform the work of the work item. The system may then validate the resource assignment based on planned resource allocation and work item planning 385. Once validated, the resource assignment may be sent 387 to the resource and/or to the manager module 37 for recording in the blockchains. Although not illustrated in the embodiment of FIG. 12C, the method of resource planning 380 may include some exchange of information between the system and the operator and/or the resource being assigned. As such, in some embodiments, the system may require inputs from the operator to validate a choice of resources to be assigned following their determination as being suitable for the work item. Similarly, in other embodiments, the resource planning method 380 may include a transaction with the resource during the validation 385 step, such that the resource may accept or reject the assignment.

Generating Reports From Different Perspectives

Given the full timeline of each item in the system, ranging from its creation to the present, it is possible to traverse all the different blockchains to generate a report from the point of view of each item in the system relating to a desired item. For example: a report on the evolution of a work item, the work schedule of a staff member, the maintenance schedule of a vehicle including an accuracy evaluation of the planning throughout its history, plotting a map indicating the location of work items and resources at any specified time, etc.

Pulling Work Items by Resources

As noted elsewhere in this document, in some embodiments, resources may be able to select ("pull") the work items that they would like to perform. The resource GUI 51 may display a listing of available work items, which may be generated by the work and resource data management system and transmitted to the resource's computing device. Certain controls may be implemented. For example, resources may be assigned permission to be able to pull work items from the system. That is, some resources might not have permission to pull work items, while other resources may have permission to pull work items. By way of another example, resources, with permission to pull work items, may be restricted on which work items may be pulled. That is, some work items may be pulled, while other work items cannot be pulled. Similarly, a work item may have certain criterion/requirements and only resources that have the appropriate qualifications to meet the work item's criterion/requirements may be able to pull that work item. Accordingly, in some embodiments, the list of available work items may be generated specific to a given resource depending on that resource's permissions and/or qualifications. The resource may request to perform a select work item via the GUI 51, and the work and resource data management system receives the request and generates a new block for the work item blockchain corresponding to the request that indicates that the resources is assigned to this work item.

Blockchain Storage Variants

In some embodiments, the work item blockchains contain all changes in regards of the work item as well as auxiliary assignments (tags, location, category, attachments) and contains any resource assignments. In these embodiments, the resource blockchains contain all changes in regards of the resource as well as auxiliary types (availability, capabilities, types, etc.) and also contains all work item assignments for the specific resource. The auxiliary blockchains only contain changes in regards of themselves and assignments of other types.

In other embodiments, the work item blockchains contain all changes in regards of the work item as well as auxiliary assignments (tags, location, category, attachments) and also contains resource assignments. However, resources are not themselves stored in blockchains, omitting the benefit for having a full audit trail in regards of resources and independent of any work item. The auxiliary chains may also only contain changes in regards of themselves and assignments to other types.

In yet other embodiments, the resource blockchains contain all changes in regards of work item, with the users/operators responsible for the creation of all work item being also considered as resources in the system and therefore stored in their respective resource blockchain. Since all updates and changes to work items stem from one of the resources, a trail of anything that happened to a work item will be retrievable through the entirety of the resource blockchains. However, as work items may not be stored in blockchains, the benefit of easily retracing and auditing a specific work item may not be as easy as with dedicated work item blockchains. Furthermore, omitting the work item blockchain may not allow for the analysis of different viewpoints into an event (i.e. the system would only allow for the resource viewpoint). In such embodiments, the auxiliary assignments (tags, location, category, attachments) may be stored directly in the resource blockchain or in their separate blockchain.

Variants for Initializing Blockchains

In order to initialize each new blockchains, whether for work items, for resources or for auxiliary types, different methods may be used. As such, the system may initialize the blockchain by referencing a system wide "global blockchain".

A global blockchain is a blockchain that contains no useful payload data but only serves as a secure starting point to initiate new blockchains. In the case of a "global blockchain", a new block is added to the global blockchain every time another blockchain is initialized. This block, then contains the usual payload and an identifier and type of the new blockchain. Using this method, the system is self-contained and does not rely on an external system. However, this implementation increases the complexity of the system's architecture. This approach may also cause issues when parts of the system (e.g. mobile clients) are disconnected, as the global chain would not be available.

In other embodiments, the initialization may be done by referencing another blockchain in the system. In this variant, a new blockchain is initialized by linking any other blockchain in the system (e.g. a new work item is attached to the previously created one). This way the system is self-contained as well, however it does not rely on a single chain, which can increase system performance and can cope with the system being partially disconnected.

Variants for Merging Conflicting Blockchains

As described herein, an implementation of the work and resource data management system may allow for an offline mobile device to continue the local storing of any operations to a work item and to perform the necessary addition of blocks in the relevant blockchains. Similarly, a mobile device suffering from a latency network connection may continue the local storing of any operations to a work item. Depending on system policies there are multiple ways to merge local blockchains in central blockchains. In the simplest case, there are no conflicts and a local blockchain can be merged in its equivalent central blockchain without any intervention. In case of conflicts, there are several options, such as: the user causing the conflict must redo the changes in the central system such that there are no conflicts or the conflicting blockchain may be added to the central system's blockchain in the payload of a new event type or as a reference to a parallel change blockchain.

The use of a separate blockchain to track conflicts allows auditing of alternative changes. The conflict can then be resolved by the user causing the change or even by a third party having the necessary authorizations (auditor, supervisor, workflow or policy engine).

Figure 10:
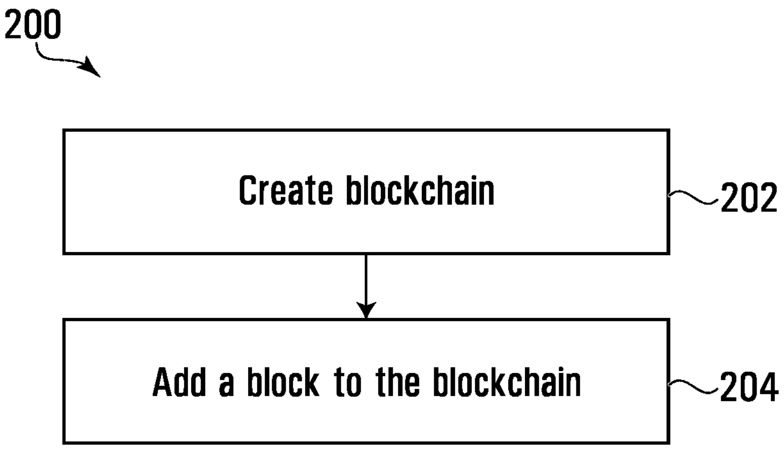
FIG. 10 is a flowchart illustrating an exemplary method for generating a blockchain.

With reference to FIG. 10, there is shown a flowchart illustrating an example method 200 for generating at least one blockchain. The method 200 may be implemented by the work and resource data management system. The steps of the method 200 may be performed by a processing unit. The method 200 may incorporate any suitable aspects described in this document. At step 202, at least one blockchain is created. Step 202 and/or the method 200 may be performed in response to a request to create a blockchain. Accordingly, step 202 and/or the method 200 may comprise receiving a request. The request may be for: generating a work item blockchain, generating a resource blockchain, or generating an attribute blockchain. The request may be human or computer initiated. Creating a blockchain at step 202 may comprise obtaining (e.g., generating, identifying, or receiving) a starting block. Creating a blockchain at step 202 may comprise generating a new blockchain independent of any existing blockchains or generating a blockchain having a first block referencing an existing blockchain. The blockchain created at step 202 may be related to a work item. By way of example, step 202 may comprise receiving a request for a work item to be performed by or with one or more resources and generating a work item blockchain for the work item in response to the request.

At step 204, a block is added to the blockchain created at step 202. Step 204 may be performed any suitable number of times to add one or more blocks to the created blockchain. Adding a block at step 204 may comprise obtaining (e.g., generating or receiving) the block and storing the block in memory. The block may be generated in response to a request (e.g., a request from an operator). The block may be received from a computing device (e.g., a computing device associated with a resource). Generating the block comprises obtaining the previous hash signature of the previous block in the blockchain, generating a current hash signature of the payload of the current block, and storing the previous hash signature and the current hash signature in metadata of the current block. Receiving the block may comprise determining the blockchain associated with the received block, and storing the received block in memory.

By way of example, in the case that the created blockchain is a work item blockchain, one or more data blocks comprising information relevant to performance of the work item may be added. By way of another example, a resource may be associated with the work item blockchain, which may include receiving a request (human or computer initiated) to assign a given resource to the work item blockchain and generating a new block comprising identifier of the resource (e.g., an identifier of the resource blockchain associated with that resource). By way of a further example, a new block may be added for each time a state change of the work item occurs. In other cases, a new block may be added each time further data pertaining to the work item is received.

In some embodiments, a resource is assigned to a work item, and assigning the resource to the work item comprises recording an assignment in the blockchain related to the work item. The assignment may be transmitted to the resource assigned to the work item, and the resource may be assigned to more than one work item. In some embodiments, in response to the assignment, the resource builds one or more blocks for the blockchain. The one or more blocks may then be received from the resource, where the blocks encode data related to a state or action of the resource related to its use or work. In some embodiments, resource has an entire copy of the blockchain, and the entire copy of the blockchain is received from the resource. It may then be determined which one of the work items that the received blocks are associated therewith, and the blocks may then be stored. Storing of the blocks may comprise storing index data in the index. The index data may be generated from the result of determining which one of the work items that the received blocks are associated therewith.

In some embodiments, a request to modify a work item may be received, and in this case a new data block making the modification is added to the blockchain—in certain user interface views, the system may show only the latest state of the work item, while the entire change evolution is security stored.

In some embodiments, a plurality of resources may be associated to a given work item, and the work item blockchain represents a plurality of timelines of events performed by or with the resources for completing the work item from the different perspectives of each resource. The work item blockchain also represents a timeline of events for performance of the work item. These timelines may represent one or more of: which resources were used in performing each item of work, at what time each item of work was performed, where each item of work was performed, how each item of work was completed, etc.

The method 200 may be repeated any suitable number of times to create multiple blockchains for work items, resources and/or attributes. The method 200 may be for storing data for work items, where each one of said work items defines issues and/or actions for handling a task or item of the work item.

Figure 11:
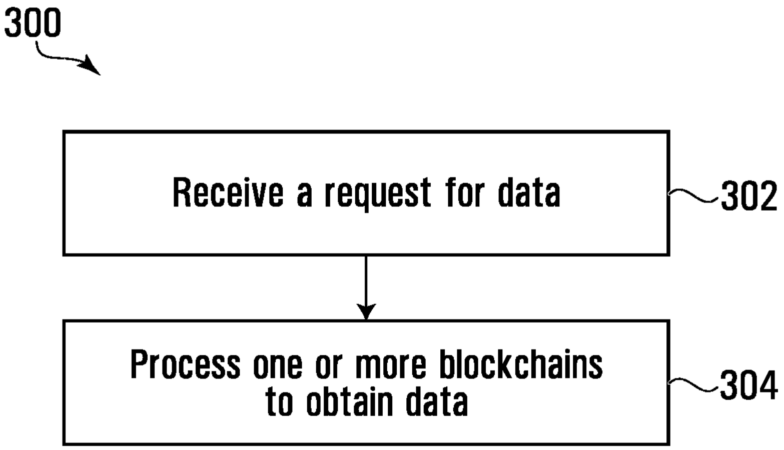
FIG. 11 is a flowchart illustrating an exemplary method for retrieving data from one or more blockchains.

With reference to FIG. 11, there is shown a flowchart illustrating an example method 300 for retrieving data from one or more blockchains. The method 300 may be implemented by the work and resource data management system. The steps of the method 300 may be performed by a processing unit. The method 300 may incorporate any suitable aspects described in this document. The method 300 may be performed after method 200 or may be performed separate therefrom. At step 302, a request for data is received. The request may pertain to one or more work items. The request may pertain to one or more resources. The request may be an audit request of one or more blockchains. The request may be to audit a specific work item. The request may be to audit a specific resource. The request may comprise an identifier for a work item (e.g., a work item chain ID). The request may comprise an identifier for a resource (e.g., a resource chain ID). The request may comprise time and/or location information.

At step 304, the one or more blockchains are processed based on the request to obtain data. Index data may be used to identify the one or more blockchains to process at step 304 in order to obtain the data therefrom. The integrity of the retrieved data may be verified using the blockchain signature (i.e., hash signatures) at step 304. The verification may occur prior to providing the retrieved data. The verification may occur by including in the retrieved data blockchain signatures. The retried data may be stored to memory, transmitted and/or displayed.

One or more timelines may be generated from the retrieved data. The timelines may comprise different timelines from the perspective of the different resources involved in the completion of a work item. The timelines may be displayed. This may be done to go back in history to see what was done by who, when and where. This may be done to audit the decisions made by a resource or an operator.

Figure 13:
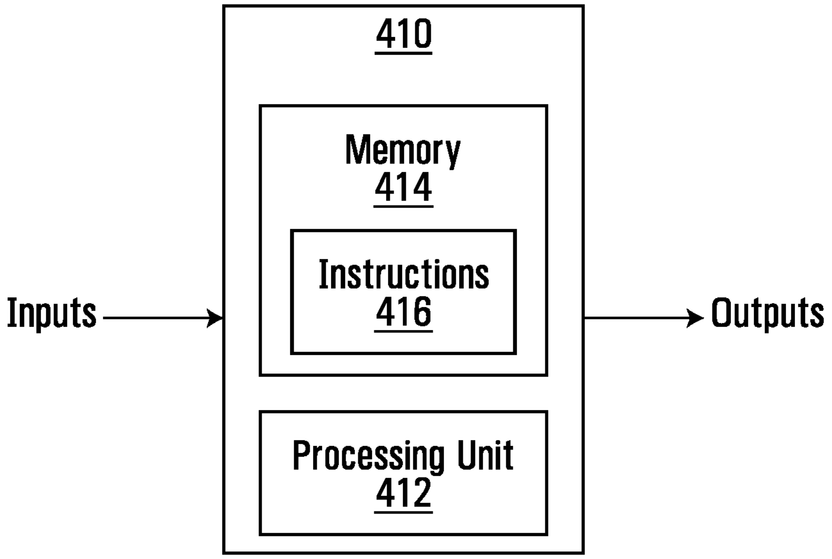
FIG. 13 is a block diagram of an exemplary computing device.

With reference to FIG. 13, the method(s) 200, 300, 350, 370 and/or 380, may be implemented by a computing device 410, comprising a processing unit 412 and a memory 414 which has stored therein computer-executable instructions 416. The work and resource data management system may comprise one or more computing devices, such as the computing device 410. The processing unit 412 may comprise any suitable devices configured to implement the method(s) 200, 300, 350, 370 and/or 380 such that instructions 416, when executed by the computing device 410 or other programmable apparatus, may cause the functions/acts/steps performed as part of the method(s) 200, 300, 350, 370 and/or 380 as described herein to be executed. The processing unit 412 may comprise, for example, any type of general-purpose microprocessor or microcontroller, a digital signal processing (DSP) processor, a central processing unit (CPU), a graphical processing unit (GPU), an integrated circuit, a field programmable gate array (FPGA), a reconfigurable processor, other suitably programmed or programmable logic circuits, or any combination thereof.

The memory 414 may comprise any suitable known or other machine-readable storage medium. The memory 414 may comprise non-transitory computer readable storage medium, for example, but not limited to, an electronic, magnetic, optical, electromagnetic, infrared, or semiconductor system, apparatus, or device, or any suitable combination of the foregoing. The memory 414 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 414 may comprise any storage means (e.g., storage devices) suitable for retrievably storing machine-readable instructions 416 executable by processing unit 412.

The methods and systems described herein may be implemented in a high-level procedural or object oriented programming or scripting language, or a combination thereof, to communicate with or assist in the operation of a computer system, for example the computing device 410. Alternatively, the methods and systems may be implemented in assembly or machine language. The language may be a compiled or interpreted language. Program code for implementing the methods and systems may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems may also be considered to be implemented by way of a non-transitory computer-readable storage medium having a computer program stored thereon. The computer program may comprise computer-readable instructions which cause a computer, or in some embodiments the processing unit 412 of the computing device 410, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

What is claimed is:

1. A method for storing data related to a plurality of work items, each one of said plurality of work items defining at least actions for handling a task to be done, the method comprising:

creating a work item blockchain related to each one of said plurality of work items;

recording an assignment in said work item blockchain related to each one of said plurality of work items, and transmitting to resources of each one of said plurality of work items said assignment, wherein said resources can be assigned to more than one of said plurality of work items;

receiving blocks of a resource blockchain from each of said resources, said blocks including blockchain identifiers and encoding data related to a state or action of said at least one resource related to their use or work and in response to said assignment in performance of said actions for handling said task, each one of said resources building said blocks of the resource blockchain;

generating an association between said blocks of a resource blockchain received and said plurality of work items in accordance with said assignment;

storing said blocks of the resource blockchain from each of said resources in resource blockchain storage;

each time a new block of said blocks of a resource blockchain from each of said resources is received, adding an entry in a database storing index data, said entry representing a link between said new block and its related work item, wherein the index data includes for each said new block an identifier of the resource blockchain and said blockchain identifier of said new block;

receiving a request to retrieve data concerning one of said plurality of work items;

in response to said request, locating in said database all entries related to said one of said plurality of work items to identify from said link of each of said entries which resource blockchains relate to said one of said plurality of work items and which blockchain identifiers of said resources blockchains relate to said one of said plurality of work items to retrieve data according to said identified resource blockchains and said identified blockchain identifiers, wherein integrity of retrieved data is verified using blockchain signatures prior to providing said retrieved data or by including in said retrieved data blockchain signatures.

2. The method for storing data as defined in claim 1, wherein said work item blockchain related to each one of said plurality of work items comprises a work item blockchain for each one of said plurality of work items.

3. The method for storing data as defined in claim 2, further comprising obtaining at least one new block for said work item blockchain responsive to said generating, said at least one new block in said work item blockchain encoding said data related to a state or action of said at least one resource related to their use or work and in response to said assignment.

4. The method for storing data as defined in claim 1, wherein said work item blockchain related to each one of said plurality of work items comprises a plurality of resource blockchains recording the actions of a corresponding plurality of resources.

5. The method for storing data as defined in claim 4, wherein the plurality of resource blockchains comprise a plurality of operator blockchains recording the actions of a corresponding plurality of operators.

6. The method for storing data as defined in claim 1, wherein said creating a work item blockchain further comprises initializing said work item blockchain by referencing a previous blockchain related to a previous work item.

7. The method for storing data as defined in claim 1, wherein said work item blockchain related to each one of said plurality of work items comprises a work item creator identifier.

8. The method for storing data as defined in claim 1, further comprising resolving a loss of continuity in at least one of said work item blockchain related to each one of said plurality of work items and said resource blockchain from each of said at least one resource.

9. The method for storing data as defined in claim 8, wherein said resolving comprises manual editing of said work item blockchain related to each one of said plurality of work items and said resource blockchain from each of said at least one resource.

10. The method for storing data as defined in claim 8, wherein said resolving comprises automatic policies editing said work item blockchain related to each one of said plurality of work items and said resource blockchain from each of said at least one resource.

11. The method for storing data as defined in claim 1, wherein said locating to retrieve data further comprises authenticating credentials of a user requesting access to said retrieved data.

12. The method for storing data as defined in claim 1, wherein said locating to retrieve data further comprises displaying a work item timeline representative of said data related to said plurality of work items.

13. The method for storing data as defined in claim 1, wherein said request to retrieve data further comprises data concerning at least one resource.

14. The method for storing data as defined in claim 1, wherein said locating to retrieve data further comprises displaying a resource timeline representative of said data related to a state or action of said at least one resource related to their use or work and in response to said assignment.

15. The method for storing data as defined in claim 1, wherein said locating to retrieve data further comprises displaying a composite timeline representative of said data related to said plurality of work items and said data related to a state or action of said at least one resource related to their use or work and in response to said assignment.

16. The method for storing data as defined in claim 1, further comprising validating integrity of at least one block of at least one of said work item blockchain related to each one of said plurality of work items and said resource blockchain from each of said at least one resource, wherein said validating integrity comprises validating blockchain signatures.

17. The method for storing data as defined in claim 1, further comprising generating a branched blockchain related to planned work item and resource activities, said branched blockchain being branched from said work item blockchain related to each one of said plurality of work items as a main branch.

18. The method for storing data as defined in claim 17, further comprising using said branched blockchain related to planned work item and resource activities to determine resource constraints and to perform an evaluation if a resource may adequately perform the work of a work item.

19. The method for storing data as defined in claim 18, further comprising validating a resource assignment using a result of said evaluation.

20. The method for storing data as defined in claim 17, further comprising, after work has been performed, comparing said branched blockchain to actual work performed as stored in said main branch.

21. The method for storing data as defined in claim 20, further comprising displaying a result of said comparison.

22. A method for storing and retrieving data related to a plurality of work items that define and relate to actions for handling a task to be done, the method comprising:

creating a plurality of work item blockchains, one for each one of said plurality of work items;

receiving details related to said task to be done for each of said plurality of work items and appending a task block to each one of said plurality of work item blockchains containing data related to said details, including cryptographically signing said block;

for each one of said plurality of work items, receiving an assignment for performing at least a part of said task to be done by ones of a plurality of resources;

appending an assignment block to said plurality of work item blockchains containing data related to said assignment, including cryptographically signing said assignment block;

transmitting said assignment to said resources;

receiving, from each of said resources, blocks of resource blockchains providing updates on progress of said resources related to performance of tasks in accordance with said assignment;

storing said resource blockchains;

for each one of said blocks of said resource blockchains received, appending to one of said plurality of work item blockchains a reference block that references a block of said resource blockchains containing an update on progress of one of said resources related to performance of tasks in accordance with said assignment, including cryptographically signing said reference block and adding an entry in a database storing index data, said entry representing a link between said each one of said blocks of said resource blockchains received and its related work item, wherein the index data includes for each one of said blocks of said resource blockchains received an identifier of the resource blockchain and a blockchain identifier of said new block;

receiving a request for information concerning one of said plurality of work items;

in response to said request, locating in said database all entries related to said one of said plurality of work items and extracting resource performance data from one of said plurality of work item blockchains related to said one of said plurality of work items using said entries, including extracting data from blocks of said resource blockchains using said reference blocks; and cryptographically validating said resource performance data and preparing a timeline view of said resource performance data related to said one of said plurality of work items.

* * * * *